United States Patent [19]

Kusumoto et al.

[11] Patent Number: 4,928,136
[45] Date of Patent: May 22, 1990

[54] IMAGE FORMING APPARATUS

[75] Inventors: Keiji Kusumoto; Naoyoshi Kinoshita, both of Osaka, Japan

[73] Assignee: Minolta Camera Kabushiki Kaisha, Japan

[21] Appl. No.: 251,666

[22] Filed: Sep. 30, 1988

[30] Foreign Application Priority Data

| Oct. 1, 1987 | [JP] | Japan | 62-248789 |
| Oct. 1, 1987 | [JP] | Japan | 62-248790 |
| Oct. 2, 1987 | [JP] | Japan | 62-250405 |
| Oct. 2, 1987 | [JP] | Japan | 62-250406 |
| Oct. 2, 1987 | [JP] | Japan | 62-250407 |

[51] Int. Cl.$^5$ .................... G03G 21/00; G03G 15/00
[52] U.S. Cl. .................... 355/315; 355/204; 355/208; 355/326; 355/327
[58] Field of Search ............... 355/204, 205, 206, 208, 355/218, 246, 274, 315, 326, 327, 328

[56] References Cited

U.S. PATENT DOCUMENTS

| 4,314,755 | 2/1982 | Kinashi | 355/208 X |
| 4,353,648 | 10/1982 | Tanaka et al. | 355/315 X |
| 4,668,978 | 5/1987 | Gokita | 355/326 X |
| 4,772,916 | 9/1988 | Mochida | 355/327 |

FOREIGN PATENT DOCUMENTS 60-212778 10/1985 Japan.

Primary Examiner—A. T. Grimley
Assistant Examiner—Sandra L. Hoffman

[57] ABSTRACT

An image forming apparatus which comprises a photoreceptor medium supported for rotation in one direction, a charging device for forming an electrostatic latent image on the photoreceptor medium, a plurality of developing devices disposed in fact-to-face relationship with the photoreceptor medium for developing the electrostatic latent image into a visible powder image, a transfer charger for transferring the powder image onto a copying sheet, a sheet transport system for supplying the copying sheet to a transfer station where the transfer charger is dispose, a detector for detecting the color of toner material contained in each of the developing devices, and a control circuitry for causing one of the developing devices to apply the toner material of a particular color to a portion of the photoreceptor medium, which corresponds in position to a leading edge of the copying sheet, in the event that such one of the developing devices is detected as containing the toner material of that particular color.

11 Claims, 22 Drawing Sheets

IMAGE FORMING APPARATUS

BACKGROUND OF THE INVENTION

1. (Field of the Invention)

The present invention generally relates to an image forming apparatus employing an electrophotographic copying process and, more particularly, to an electrophotographic copying machine.

2. (Description of the Prior Art)

The electrophotographic copying machine is known to comprise a photosensitive medium supported for movement past a charging station at which an electrostatic charger is disposed for imparting an electrostatic charge to the photoreceptor medium; an exposure station at which a ribbon of light carrying an image of an original document to be copied is projected onto the photoreceptor medium to form an electrostatic latent image on the photoreceptor medium in a pattern complemental to the image of the original document; a developing station at which a developing system is disposed for applying toner material to the photoreceptor medium to develop the electrostatic latent image into a visible powder image; a transfer station at which the powder image can be transferred onto a copying paper supplied from a paper supply unit; a paper separating station at which the paper with the powder image having been transferred thereto is separated or removed away from the photoreceptor medium; and a cleaning station at which the residual toner material and the residual electrostatic charge both remaining on the photoreceptor medium are removed in readiness for the next cycle of electrophotographic copying process. The copying paper so separated or removed from the photoreceptor medium is transported to a fixing station at which the powder image on the copying paper is permanently fixed.

The electrophotographic copying machine having a plurality of developing units is also well known in the art. In this type of copying machine, toner material of different colors are accommodated in the respective developing units, and the developing units are adapted to be selectively driven into operation for applying the toner material in the selected developing unit to the photoreceptor medium to form the powder image.

In any event, at the separating station, either a mechanical separating pawl, a discharger for applying an alternating current to remove the charge built up on the copying paper for the purpose of lessening the force of attraction acting between the photoreceptor medium and the copying paper, of a combination thereof has hitherto been employed for separating the copying paper from the photoreceptor medium.

In the system wherein the mechanical separating pawl is employed, the tip of the separating pawl must be carefully designed and tailored to avoid any possible damage to the photoreceptor medium. Therefore, not only is the separating pawl supported for movement between separating and retracted positions either in a direction laterally of the direction of movement of the photoreceptor medium or in a direction close towards and away from the photoreceptor medium, a complicated and expensive mechanical system is necessitated for the support of the separating pawl.

On the other hand, in the system wherein the discharger is employed, the extent to which the copying paper with the visible powder image having been transferred thereto at the transfer station is smoothly separated away from the photoreceptor medium at the subsequent separating station tends to be affected by several conditions including, inter alia, the condition in which toner particles are applied to the photoreceptor medium and the charging condition of the photoreceptor drum. Accordingly, it has often been experienced that the copying paper with the powder image having been transferred thereto is carried away from the separating station together with the continued movement of the photoreceptor medium without being separated from the photoreceptor medium.

SUMMARY OF THE INVENTION

The present invention has been devised with a view to substantially eliminating the above discussed problems and has for its essential object to provide an improved image forming apparatus of the type referred to above, wherein means is provided for facilitating the smooth and ready separation of the copying sheet, with the powder image having been transferred thereto at the transfer station, from the photoreceptor medium, thereby to minimize any possible damage to the photoreceptor medium which would take place when the mechanical separating element is brought into sliding contact with the photoreceptor medium.

In order to accomplish the above described object of the present invention, there is provided, in accordance with a preferred embodiment of the present invention, an image forming apparatus which comprises a photoreceptor medium supported for rotation in a predetermined direction, means for forming an electrostatic latent image on the photoreceptor medium, a plurality of developing means disposed in fact-to-face relationship with the photoreceptor medium for developing the electrostatic latent image into a visible powder image, means for transferring the powder image onto a copying sheet, means for supplying the copying sheet to a transfer station where the transferring means is dispose, means for detecting the color of toner material contained in each of the developing means, and a control means for causing one of the developing means to apply the toner material of a particular color to a portion of the photoreceptor medium, which corresponds in position to a leading edge of the copying sheet, in the event that such one of the developing means is detected as containing the toner material of that particular color.

Preferably, that particular color of the toner material may be white in view of the fact that white papers are generally supplied in the market a standard copying papers. Specifically, it is recommendable that the toner material which eventually form the toner deposit at the leading edge of the copying sheet is of a color identical or substantially identical with the color of the copying sheet.

According to the present invention, at the transfer station, not only is the powder image corresponding in pattern to the image to be copied transferred onto the copying sheet, but also the toner material which eventually form the toner deposit is transferred to the leading edge of the copying sheet. The presence of the toner deposit at the leading edge of the copying sheet is effective to reduce the electrostatic force of attraction acting between the copying sheet and the photoreceptor medium so that, at the next succeeding transfer station, the leading edge of the copying sheet can be readily separated away from the photoreceptor medium.

In another preferred embodiment of the present invention, the application of the toner material to that portion of the photoreceptor medium corresponding to the leading edge of the copying sheet may be disabled in the event that, instead of a standard copying paper, a special sheet, firm and thick, such as, for example, a generally transparent or semitransparent tracing paper, plastics sheet or a multi-ply paper, is inserted in the image forming apparatus. This is because the firm and thick copying sheet generally tends to exhibit a tendency to stretch taught and, accordingly, even without the toner deposit formed on the leading edge of such special sheet, the special sheet can, after the powder image corresponding to the image to be copied has been transferred thereto, separate from the photoreceptor medium.

In a further preferred embodiment of the present invention, a humidity sensor is provided for detecting the relative humidity in the environment in which one or a plurality of batches of copying sheets are placed, or for detecting the moisture content of the copying sheets, so that, only when the relative humidity or the moisture content is detected higher than a predetermined value, the application of the toner material to eventually form the toner deposit on the leading edge of the copying sheet can be effected.

BRIEF DESCRIPTION OF THE DRAWINGS

In any event, these and other objects and features of the present invention will become clear from the detailed description of preferred embodiments of the present invention made with reference to the accompanying drawings, in which:

FIG. 23b is a diagram showing a manual feed mechanism used in the copying machine shown in FIG. 23a;

DESCRIPTION OF THE EMBODIMENTS

Figure 1:
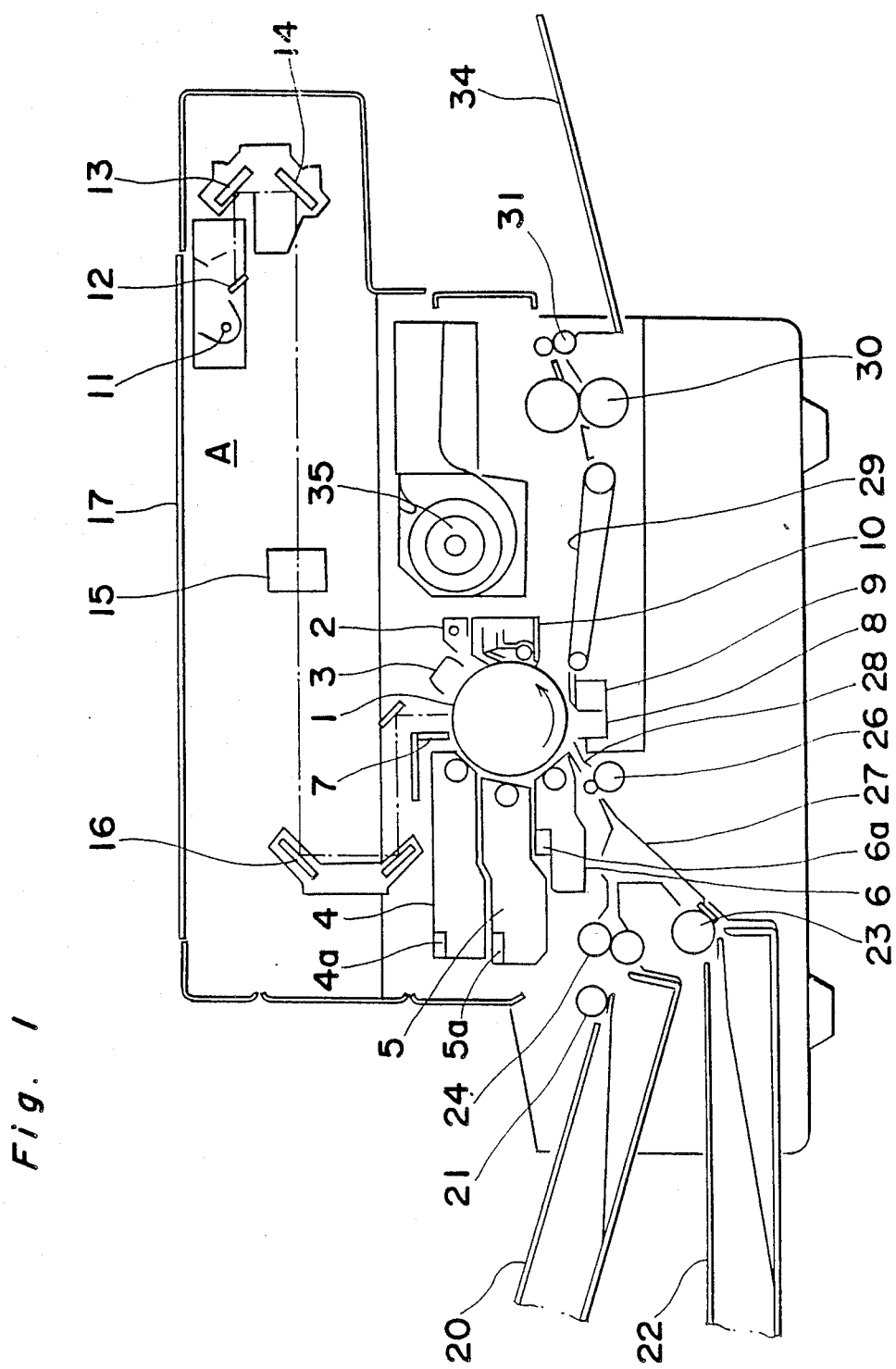
FIG. 1 is a schematic longitudinal sectional view of an electrophotographic copying machine according to a first preferred embodiment of the present invention.

Before the description of the present invention proceeds, it is to be noted that like parts are designated by like reference numerals throughout the accompanying drawings. It is also to be noted that, for facilitating a better and ready understanding of the present invention, the individual preferred embodiments will be described under separate headings although some of the accompanying drawings referred to in the description of one or more specific embodiments of the present invention may be referred to in the description of the other embodiment or embodiments of the present invention.

First Embodiment (FIGS. 1 to 13)

Referring first to FIG. 1, there is shown a copying machine capable of performing an electrophotographic copying process. The machine comprises a photoreceptor drum 1 supported for rotation in a predetermined direction, for example, in a direction shown by the arrow, successively past a plurality of processing stations. These processing stations include, as is well known to those skilled in the art, a radiating station at which a main eraser lamp 2 is disposed; a charging station at which an electrostatic charger 3 is disposed for imparting an electrostatic charge to the outer peripheral surface of the drum 1; an exposure station at which a ribbon of light carrying an image of an original document placed on a document support which is successively scanned by a optical system A is projected onto the outer peripheral surface of the drum 1 to form an electrostatic latent image on the outer peripheral surface of the drum 1 in a pattern complemental to the image of the original document; a developing station at which developing devices 4, 5 and 6 are disposed for applying a developer material to the photoreceptor drum 1 to develop the electrostatic latent image into a visible powder image; a transfer station at which a transfer charger 8 is disposed for applying an electric field to a copying paper S, being supplied in a direction shown by the arrow c, so that the powder image can be electrostatically transferred onto a copying paper supplied from a paper supply unit by way of a timing roller pair 26 synchronized with the rotation of the drum 1; a paper separating station at which a paper separating charger 9 is disposed in side-by-side fashion with the transfer charger 8 and a cleaning station at which a bladetype cleaning unit 10 is disposed for removing residual toner and residual electrostatic charge remaining on the outer peripheral surface of the drum 1, respectively, in readiness for the next cycle of electrophotographic copying process.

Each of the developing devices 4, 5 and 6 is provided with a respective identifier 4a, 5a and 6a for identifying the color of toner material accommodated within such developing devices 4, 5 and 6. Each of these identifiers 4a, 5a and 6a are set by an associated dip switch at the time of replenishment of a toner material, and in the illustrated embodiment, a 3-bit signal from the dip switch is inputted to one-chip microcomputer 200, as will be described later, so that a combination of logic High and Low signals can be utilized to identify the color of the developing material in the particular developing device 4, 5 or 6. The photoreceptor drum 1 is of a type having a photosensitive layer deposited on the outer peripheral surface thereof and is adapted to be radiated with rays of light from the eraser lamp 2 each time a single copy has been made, then to be electrostatically charged by the electrostatic charger 3 as it subsequently moves past the charging station and to be exposed at the exposure station to the imagewise rays of light projected through the optical system A.

The optical system A is adapted to scan the document placed on a document supporting glass table 17 and includes a light source 11, movable mirrors 12, 13 and 14, a projector lens assembly 15 and a mirror 16.

The paper supply unit positioned at a left-hand portion of the machine as viewed in FIG. 1 has upper and lower supply openings, positioned one above the other, which are respectively coupled with upper and lower paper cassettes 20 and 22 each accommodating a batch of copying papers. Papers in each of the paper cassettes 20 and 22 can be supplied one by one towards the transfer station by paper supply rollers 21 and 22 and then towards a fixing unit 30 through a transport path including a roller pair 24, the timing roller pair 26, a guide plate 27, and a guide plate 28 positioned in the vicinity of the transfer station. Each copying paper on which the powder image has been fixed by the fixing unit 30 can be discharged to the outside of the machine through an discharging roller pair 31 and then onto a copy receiving tray 34.

The document placed on the document supporting glass plate 17 can be scanned by the optical system A, and the resultant imagewise rays of light are converged by the mirrors and the lens assembly on the photoreceptor drum 1 to form an electrostatic latent image thereon. The electrostatic latent image so formed is subsequently developed into a visible powder image by means of a selected one of the developing devices 4, 5 and 6 which are adapted to be selectively driven into operation. The visible powder image on the photoreceptor drum 1 is then transferred by the transfer charger 8 onto the copying paper which has been supplied thereto by the timing roller pair 26 synchronized with the rotation of the photoreceptor drum 1. Thereafter, the copying paper to which the powder image has been transferred is separated by the separating charger 9 from the outer peripheral surface of the photoreceptor drum 1 and is subsequently conveyed by the conveyor belt 29 towards the developing unit 30 at which the toner particles forming the powder image are fused to fix on the copying paper before it is discharged by the discharging roller pair 31 onto the receiving tray 34.

All of the photoreceptor drum 1, the paper supply rollers 21 and 23, the roller pair 24, the timing roller pair 26, the developing devices 4, 5 and 6, the conveyor belt 29, the fixing unit 30 and the discharging roller pair 31 are drivingly coupled with a main drive motor 35. In particular, the drive from the main drive motor 35 can be selectively connected and disconnected by solenoid units, electromagnetic spring clutches or the like to and from the paper supply rollers 21 and 23, the timing roller pair 26, the roller pair 24, and the developing devices 4 to 6 so that they can be operated individually.

Figure 2:
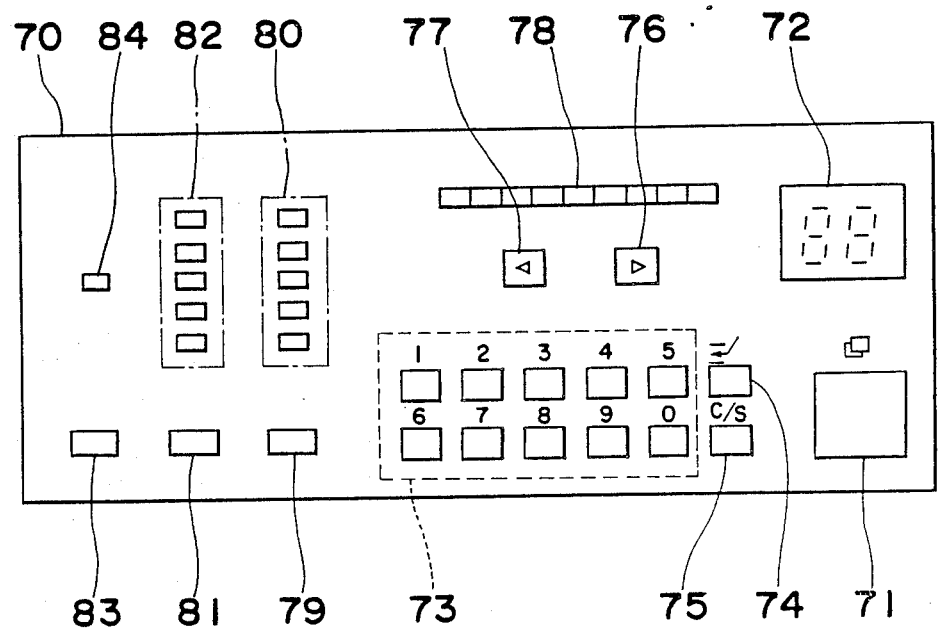
FIG. 2 is a diagram showing the arrangement of various buttons and keys on an operating panel of the copying machine.

FIG. 2 illustrates an operating panel 70 mounted atop the machine. The operating panel 70 shown therein includes a PRINT button 71, a copy display window 72 comprised of a digit display LED and through which the number of copies made is displayed, a group of numeric keys 73 through which the number of copies desired to be made is inputted, an INTERRUPTION key 74, a CLEAR/STOP key 75, exposure amount up-shift and down-shift keys 76 and 77, an exposure amount display window 78 comprised of an exposure amount display LED and through which the position of either one of the up-shift and down-shift keys 76 and 77 can be displayed, a TONER COLOR SELECT key 79, a group of selected color display LEDs for displaying the color of toner selected by manipulating the TONER COLOR SELECT key 79, a PAPER SELECT key 81, and a group of selected paper display LEDs 82 through which the paper selected by the manipulation of the PAPER SELECT key 81 is displayed, a TONER ADHERENCE CONTROL execution key 83 for executing the control for the application of toner to a leading edge of the copying paper with respect to the direction of transport thereof, and a display LED 84 for the display of the execution of the toner apply control.

FIGS. 3 to 8 illustrates the details of the developing devices used in the illustrated copying machine. It is to be noted that, since as a rule the override system employed for the developing devices is such that, when one of the developing device is in operation, the others of the developing devices are held in inoperative position, reference is made to only two of the developing devices, that is, the developing devices 5 and 6, will be made in the following description for the sake of brevity.

Figure 3:
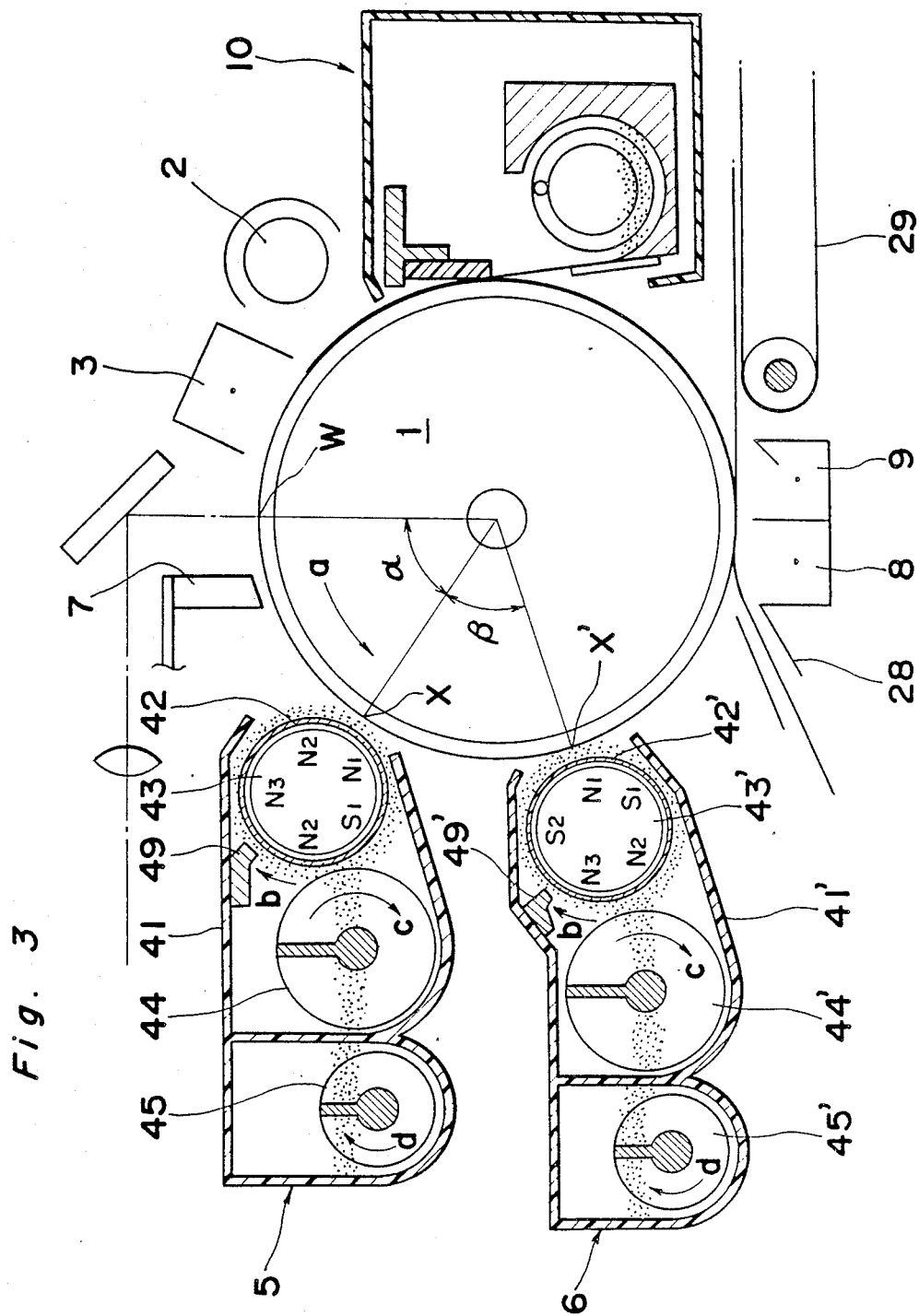
FIG. 3 is a longitudinal sectional view, on an enlarged scale, showing the details of a photoreceptor drum and machine components disposed therearound.

As shown in FIG. 3, the developing devices 5 and 6 are of substantially identical construction, each comprising a developer tank 41 in which a developing sleeve 42, a supply roller 44 and a feed screw 45 are accommodated and arranged in the specific order in a direction away from the photoreceptor drum 1.

The developing sleeve 42 is of a cylindrical shape having a diameter of 24.5 mm and made of non-magnetizeable electroconductive material. The outer peripheral surface of the developing sleeve 42 is roughened by the use of a sand blasting technique to have minute surface irregularities. This developing sleeve 42 is so supported and so positioned as to permit the outer peripheral surface thereof to define a developing gap Ds (=0.6 mm) at the developing station X or X' in cooperation with the photoreceptor drum 1, the developing station X or X' being spaced an angle of $\alpha$ or $\alpha+\beta$ in a direction circumferentially of the photoreceptor drum 1 from the exposure station X at which the imagewise rays of light are projected onto the photoreceptor drum 1.

On one side of the developing sleeve 42 opposite to the developing station X, a bristle height regulating member 49 is secured to an inner top wall portion of the developer tank 41 so as to confront the developing sleeve 42 with a regulating gap Db (=0.4 mm) defined therebetween.

A magnet roller 43 comprised of a plurality of magnet bars arranged parallel to each other in a direction circumferentially of the developing sleeve 42 and extending parallel to the axis of rotation of the developing sleeve 42 is accommodated within the developing sleeve 42. The magnet roller 43 has magnetic poles N1, N2 and N3 and S1 and S3 located on the peripheral surface thereof and facing the inner peripheral surface of the developing sleeve 42. The magnetic pole N1 emanates a magnetic force of 1,000 gausses; the magnetic poles N2 and N3 emanate a magnetic force of 500 gausses, and the magnetic poles S1 and S2 emanate a magnetic force of 800 gausses.

The center of the magnetic pole N1 is spaced an angle $\theta 1$ (80°) from the center of the magnetic pole S1 in a direction clockwise about the axis of rotation of the developing sleeve 41, and the center of the magnetic pole N3, when and so long as the magnetic pole N1 confronts the developing station X, assumes a position spaced an angle of $\theta 2$ (40°) from the position of the bristle regulating member 49 in a direction counterclockwise about the axis of rotation of the developing sleeve 42.

Figure 4:
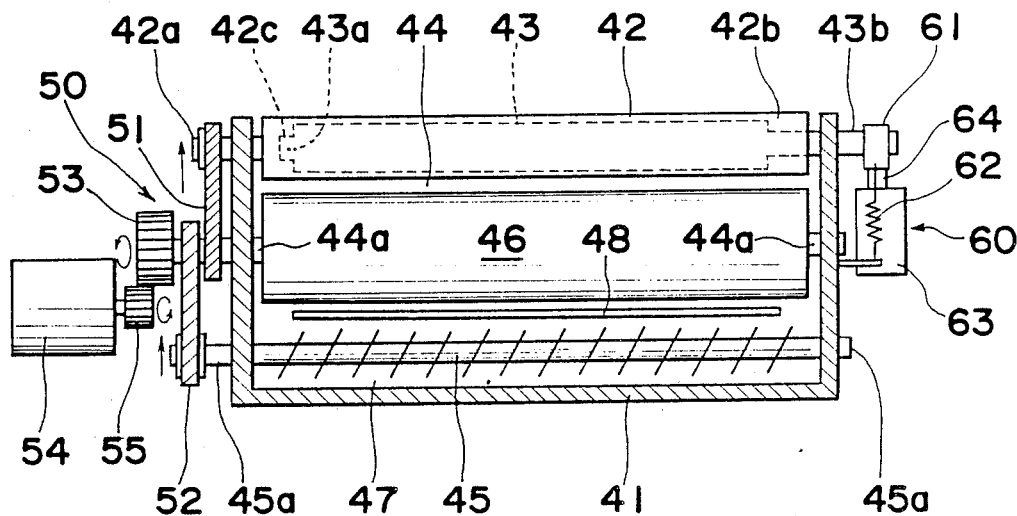
FIG. 4 is a longitudinal sectional view of one of developing units shown in FIG. 3.

The magnet roller 43 has a pair of stud shafts 43a and 43b extending axially outwardly therefrom and is, as best shown in FIG. 4, supported within the developing sleeve 42 with the stud shaft 43a received in a bearing recess 42c that is formed inside the developing sleeve 42 while the stud shaft 43b is rotatably supported by a lateral wall of the developer tank 41. This magnet roller 43 is adapted to be driven by a moving means 60, as will be described later, for intermittent rotation through a predetermined angle ($\theta 1=40°$) within the developing sleeve 42.

On the other hand, as best shown in FIG. 4, the developing sleeve 42 also has a stud shaft 42a protruding axially one end thereof adjacent the stud shaft 43a of the magnet roller 43, said stud shaft 42a being drivingly coupled by means of an endless drive belt 51 with a stud shaft 44a of the supply roller 44 which is in turn drivingly coupled with a stud shaft 45a of the feed screw 45 by means of an endless belt 52. A driven gear 53 is mounted on the stud shaft 44a of the supply roller 44 for rotation together therewith, said driven gear 53 being adapted to be coupled with a drive source (not shown) through a drive gear 55 and then through an electromagnetic spring clutch 54.

Accordingly, when the electromagnetic spring clutch 54 is energized to assume an ON state, the drive gear 55 can be driven in a direction shown by the solid line in FIG. 4 with the driven gear 53 and the endless belts 51 and 52 consequently driven in respective directions shown by the solid lines. As a result thereof, the developing sleeve 42, the supply roller 44 and the feed screw 45 can be rotated in respective directions shown by the arrows b, c and d. It is to be noted that the developing sleeve 42 at this time can be driven at 240 rpm.

Figure 6:
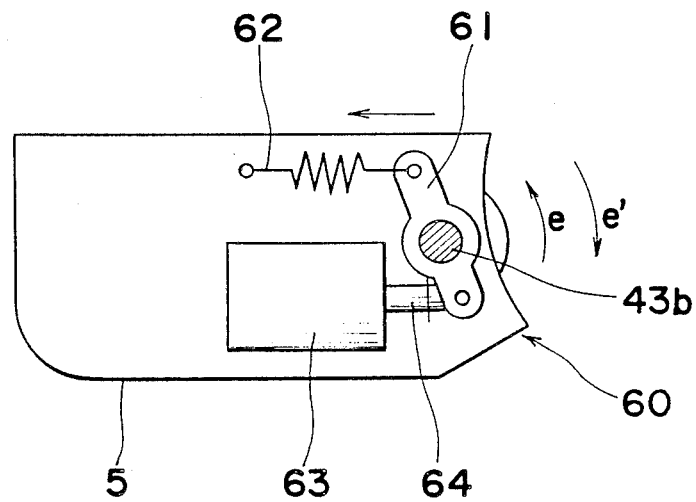
FIGS. 6 and 8 are schematic diagrams illustrating a drive mechanism for a magnet roller in each of the developing unit, which mechanism is shown as held in different operative positions, respectively.
Figure 8:
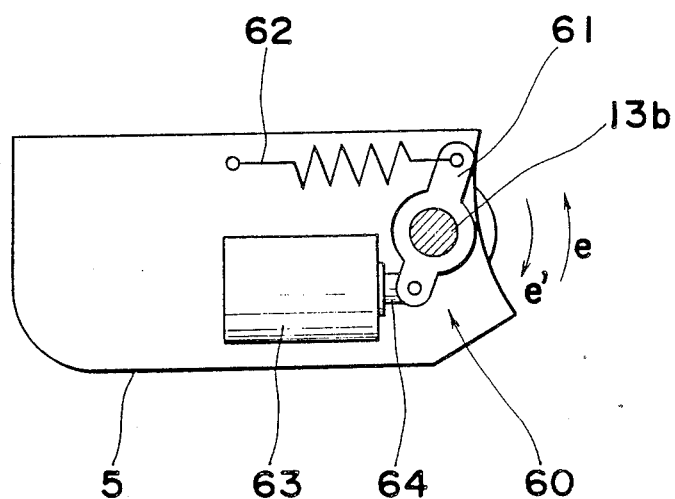

The moving means 60 for angularly moving the magnet roller 43 is best shown in FIGS. 6 and 8 and comprises a lever 61, a biasing spring 62, and a solenoid unit 63. The lever 61 is fixedly secured to the stud shaft 43b of the magnet roller 43 and has one end coupled to the developer tank 41 through the biasing spring 62 operable to urge the lever 61 in one direction counterclockwise as shown by the arrow e, the opposite end of said lever 61 being pivotally coupled to a plunger 64 of the solenoid unit 63. Accordingly, when the solenoid unit 63 is driven, the lever 62 can be rotated in a direction clockwise as shown by the arrow e' against the biasing spring 62.

Figure 5:
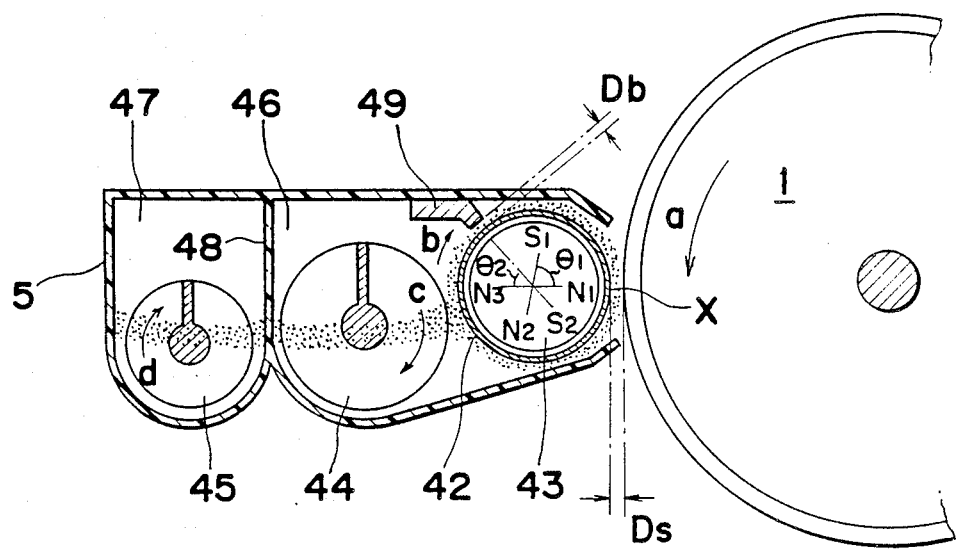
FIGS. 5 and 7 are longitudinal sectional view of one of the developing units, shown as held in different operative positions, respectively.

When and so long as the solenoid unit 63 is inoperative, that is, when and so long as the lever 61 assumes a position shown in FIG. 6, the magnetic pole N1 in the magnet roller 43 confronts the developing station X while the magnetic pole N3 is retracted to a position spaced the angle $\theta 2$ (40) in the direction counterclockwise from the position of the bristle height regulating member 49 as shown in FIG. 5.

Figure 7:
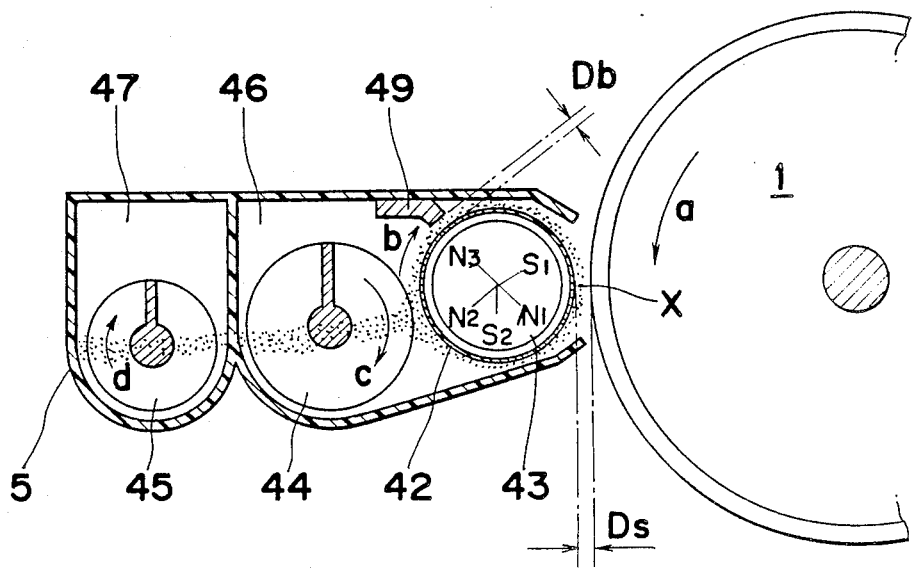

Conversely, when the solenoid unit 63 is driven with the lever 61 consequently assuming a position shown in FIG. 8, the magnetic pole N3 confronts the regulating gap Db and an intermediate portion between the magnetic poles N1 and S1 confronts the developing station X as shown in FIG. 7.

While in the condition shown in FIG. 5 the toner material supplied from the developing device 5 is applied to the photoreceptor drum to form the visible powder image, in the condition shown in FIG. 7 no toner material from the developing device 5 is applied to the photoreceptor drum 1. More specifically, in the condition shown in FIG. 7, since the portion intermediate between the magnetic poles N1 and S1 confronts the photoreceptor drum 1 through the developing station, a portion of the outer peripheral surface of the developing sleeve 42 where no toner particle is magnetically attracted confronts the photoreceptor drum 1 through the developing station and no toner particle is applied to the photoreceptor drum 1.

By selectively overriding the plural developing devices each being of the construction described above at a predetermined timing appropriate for a predetermined image forming area, toner material of different color can be applied to different image forming areas. This system is well known in the art and some overriding systems are also well known in the art.

Figure 9:
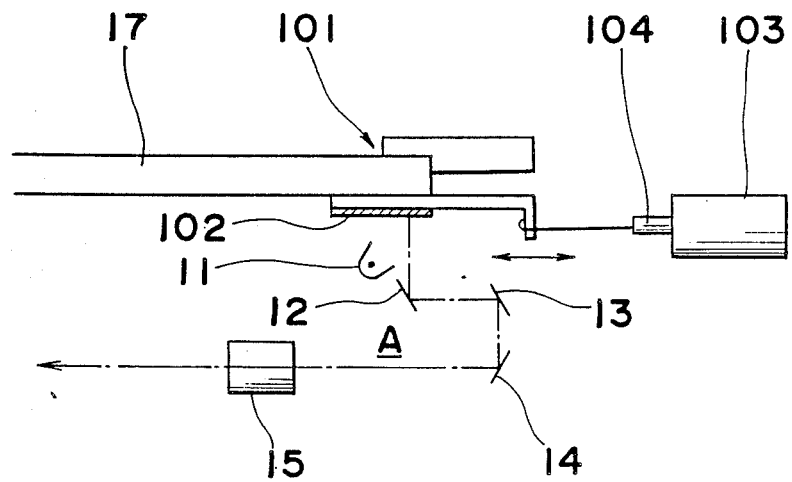
FIGS. 9 and 10 schematic diagrams showing different types of shutter for shielding the path of travel of imagewise rays of light which can be employed in the practice of the present invention, respectively.
Figure 10:
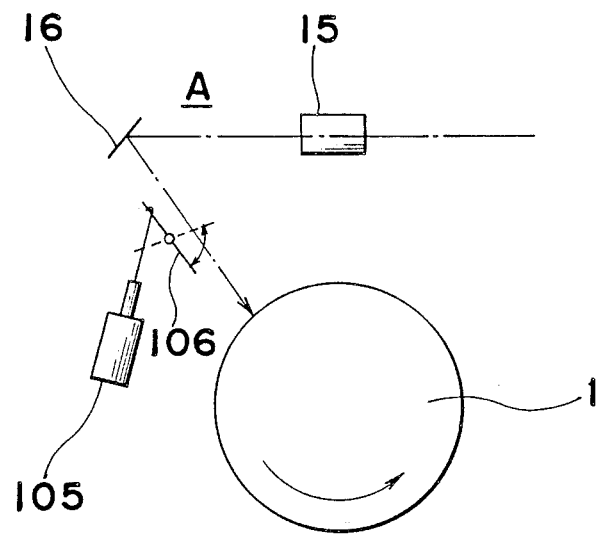

FIGS. 9 and 10 illustrate different devices for forming an electrostatic latent image corresponding to a leader solid image on that portion of the photosensitive surface of the photoreceptor drum 1 which corresponds to a predetermined area of the leading edge portion of the copying paper with respect to the direction of supply thereof. In particular, FIG. 9 illustrates the device wherein a generally elongated shutter 102 formed by applying a black paint or a paint of pigments of low light reflectivity to a portion of the undersurface of the document supporting glass plate 17 which corresponds to a leading edge portion 101 of the image to be copied is so arranged and so supported as to be selectively moved between retracted and operative positions by a solenoid unit 103, having a plunger 104 operatively coupled thereto, in a direction substantially parallel to the direction of scan of the optical system A. In this arrangement, when the shutter 102 is in the operative position as driven by the solenoid unit 103 and therefore lies on an effective image area with respect to the image leading edge portion 101, the shutter extends in a direction perpendicular to the direction of scan of the optical system A and lies in position to form an electrostatic latent image corresponding to the image of the shutter 102 on that portion of the photosensitive surface of the photoreceptor drum 1. On the other hand, when and so long as the shutter 102 is in the retracted position and therefore lies on the other side than the effective image area, the electrostatic latent image corresponding to the image of the shutter 102 can be formed on a portion of the photosensitive surface of the photoreceptor drum 1 other than the effective image area.

FIG. 10 illustrates the device wherein a shutter 106 operatively coupled with a shutter solenoid unit 105 is disposed on the path of travel of the imagewise rays of light in the optical system A for selectively movement into blocking and clearing positions, the blocking position being that the imagewise rays of light travelling towards the photoreceptor drum 1 can be intercepted whereas the clearing position is that the imagewise rays of light can travel towards the photoreceptor drum 1 without being interfered by the shutter 106. When the shutter solenoid unit 105 is driven at a timing corresponding to the image leading edge portion with the shutter 106 consequently brought to the blocking position, an electrostatic latent image corresponding to a solid image can be formed on the photoreceptor drum 1, but when the shutter 106 is moved to the clearing position, an electrostatic latent image corresponding to the image carried by the rays of light through the optical system A can be formed on the photoreceptor drum 1.

It is to be noted that the electrostatic latent image need not be always correspond to the solid image, but may correspond to a striped pattern or a mosaic pattern depending on the relationship of the adherence proportion of the copying paper adhering to the photoreceptor drum 1.

Figure 11:
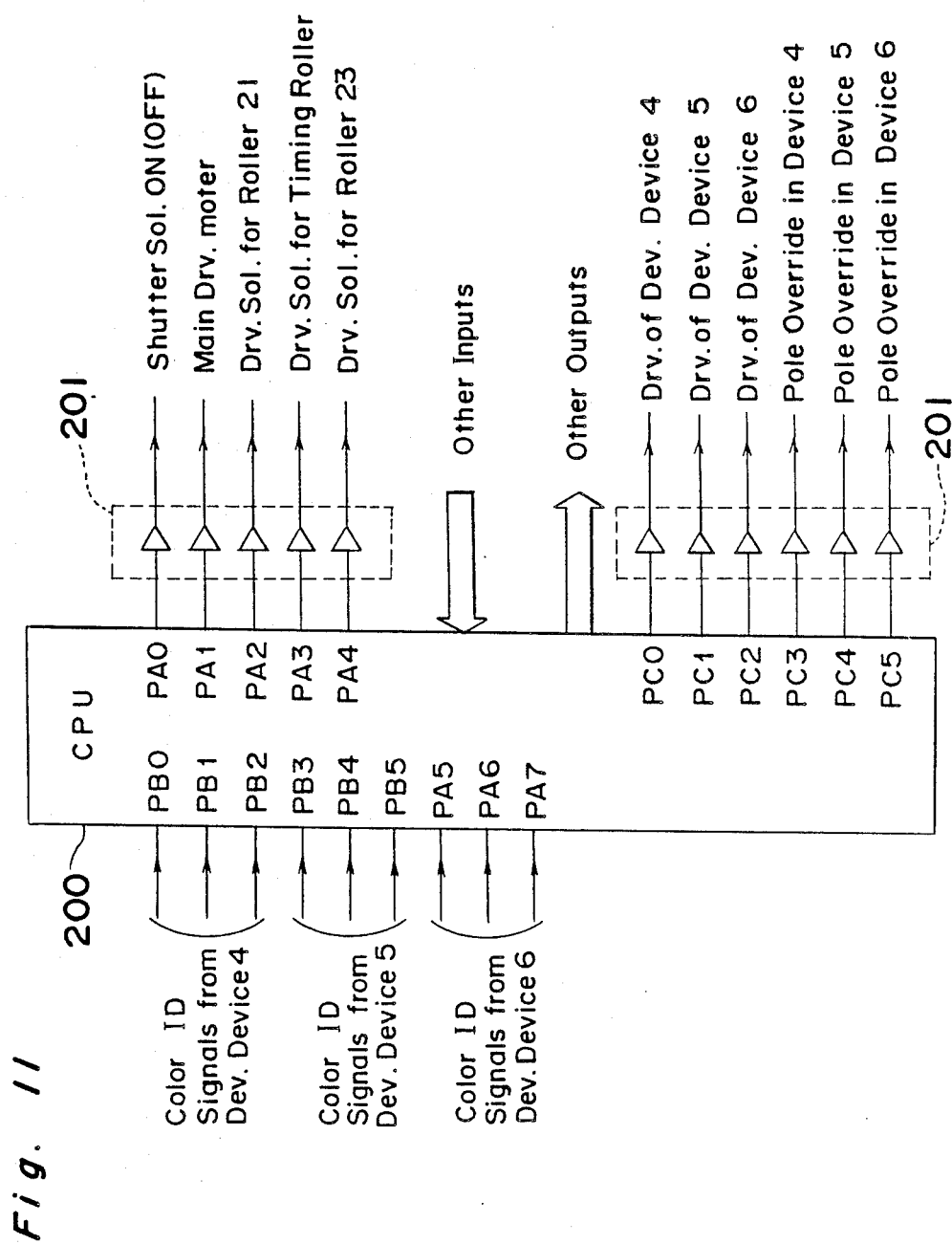
FIG. 11 is a schematic diagram showing a microcomputer used in the copying machine according to the first preferred embodiment of the present invention.

FIG. 11 illustrates schematically a control circuit employed in the illustrated embodiment. The control circuit makes use of one-chip microcomputer 200 having an analog-to-digital converter built therein. In this FIG. 11, reference numeral 201 represents a drive IC for driving the main drive motor 35, the timing roller pair 26 and so on, and the solenoid unit 103 or 104, the main drive motor 35, a drive solenoid unit for driving the paper supply roller 21 a drive solenoid unit for driving the timing roller pair 26 and a drive solenoid unit for driving the paper supply roller 23 are controlled in response to output signals emerging respectively from output ports PA0, PA1, PA2, PA3 and PA4 of the microcomputer 200.

The microcomputer 200 also has output ports PC0 to PC5 for providing respective output signals necessary to control associated clutches for driving the developing devices 4 to 6 and associated solenoid units for displacing the respective positions of the magnetic poles of the magnet roller within the corresponding developing devices 4 to 6, and input ports PB0 to PB2, PB3 to PB5 and PA6 to PA7 to which 3-bit code signals used to identify the color of toner material accommodated within the developing devices 4 to 6, respectively, are inputted so that the microcomputer 200 can recognize the color of the toner material within these developing devices 4 to 6. This one-chip microcomputer 200 furthermore has additional input and output ports adapted to receive other information associated with the control of the copying machine and to output other information required by peripheral circuit components.

Figure 12:
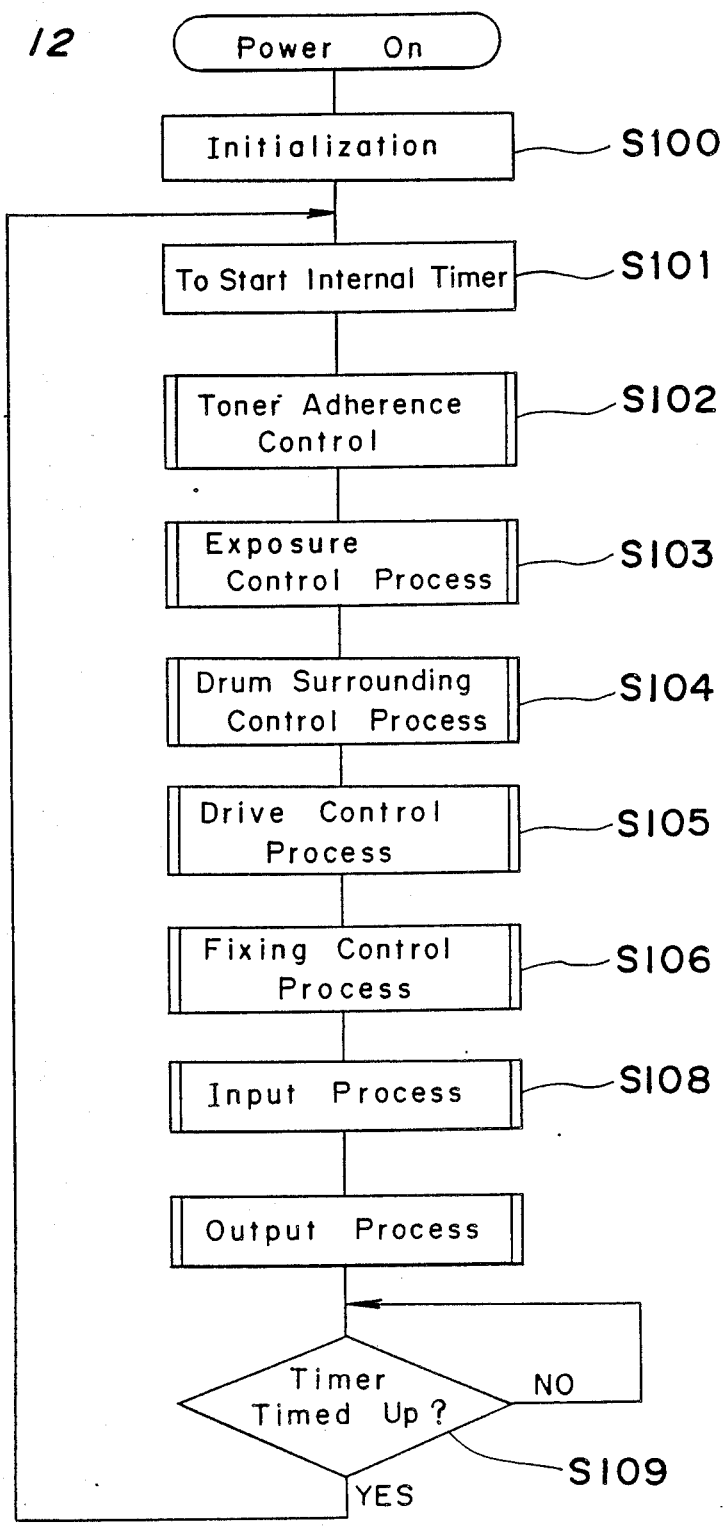
FIG. 12 is a flowchart showing the sequence of operation of the microcomputer shown in FIG. 11.

FIG. 12 illustrates a main flow showing the sequence of operation of the copying machine according to the first preferred embodiment of the present invention.

Referring now to FIG. 12, and assuming that the machine is electrically powered, internal registers and various timers are initialized to respective initial states at step S100. At subsequent step S101, the internal timers are started to determine one routine time during which the subsequent process takes place. In other words, this process is performed in the machine embodying the present invention for each routine time which is a minute time.

At step S102, a toner adherence control routine for controlling the adherence of toner to the leading edge a copying paper is executed, the details of which routine will be described later with reference to FIG. 13.

During the execution of a flow from step S103 to step S108, processes associated with a copying operation of the copying machine which include an exposure control process, a drum surrounding process, a drive control process, a fixing control process, an input process and an output process other than the foregoing processes are executed. However, it is to be noted that, since those processes are not relevant to the present invention and are well known in the art, they will not be herein described for the sake of brevity.

At step S109, a decision is made to determine if the internal timers have been timed up. If the result of the decision indicates "Yes", the program flow returns to step S102, but if it indicates "No", a wait takes place until the internal timers are timed up.

Figure 13:
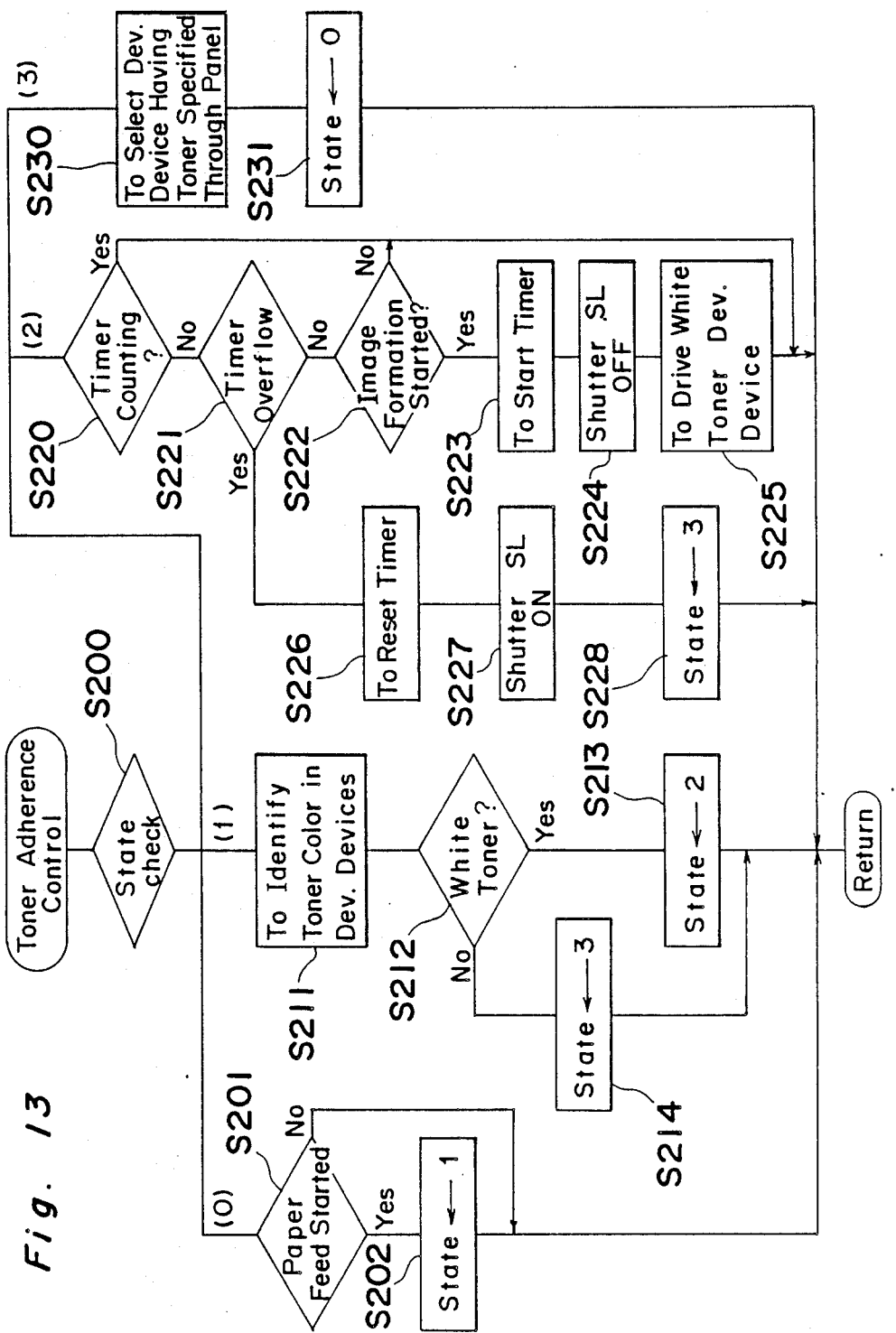
FIG. 13 is a flowchart showing a toner adherence control subroutine executed during the execution of the flow of FIG. 12.

Referring now to FIG. 13 showing the toner adherence control routine, a state check takes place at step S200. States is set to one of 0, 1, 2 and 3 depending on a control condition. By checking this value, a current control condition can be determined, and depending on the determination, one of four branch flows (0), (1), (2) and (3) associated with the respective states takes place.

Where the state check at step S200 indicates "0", a decision is first made at step S201 to determine if the supply of a copying paper has been started. If the supply of the copying paper has not yet been started, that is, the result of the decision at step S201 indicates "No", this subroutine is terminated and the program flow returns to the main routine shown in FIG. 12. In such case, a paper supply initiating signal is generated during the execution of a different subroutine. On the other hand, where the state check at step S200 indicates "1", the colors of toner accommodated in the mounted developing devices 4, 5 and 6 are identified at step S211, followed by step S212 at which a decision is made to determine if the identified colors include a white color, that is, if one of the developing devices 4 to 6 accommodates the white toner material. In the event that the result of the decision at step S212 indicates "Yes", the program flow proceeds to step S213 at which the state is rendered to be 2, but in the event that the result of the decision at step S212 indicates "No", the program flow proceeds to step S214 at which the state is rendered to be 3, and the subroutine subsequently terminates.

Where the state check at step S200 indicates "2", a decision is made at step S220 to determine if a timer is in a counting operation. This timer is used to regulate the width of an area to which toner material is allowed to adhere on the outer peripheral surface of the photoreceptor drum 1. If this timer is in the counting operation, that is, if the result of the decision at step S220 indicates "Yes", it means that a control for applying the toner material to the leading edge is being executed, and therefore, this subroutine is terminated and the program flow returns to the main routine. Should the result of the decision at step S220 indicates "No", the program flow proceeds to step S221 at which a decision is made to determine if the timer overflows. In the event that the timer overflows, that is, if the result of the decision at step S221 indicates "Yes", it means that the control for applying the toner material to the leading edge has been terminated, and therefore, the program flow proceeds to step S226 at which the timer is reset, followed by step S227 at which the shutter solenoid unit 103 is energized (or deenergized in the case of the shutter solenoid unit 105) and, thereafter, the state is rendered at step S228 to be 3 before the subroutine terminates and the program flow returns to the main routine.

Should the result of the decision at step S221 indicates that the timer does not overflow, the program flow proceeds to step S222 at which the control for applying the toner material to the leading edge is carried out. At step S222, a decision is made to determine if an image formation initiating signal (which may be generated from a different subroutine) is inputted. If the image formation initiating signal is inputted, that is, if the result of the decision at step S222 indicates "Yes", the program flow proceeds to step S223 at which the timer is started, followed by step S224 at which the shutter solenoid unit 103 for driving the shutter 102 (or 106) for applying the toner material to that portion of the photoreceptor drum 1 corresponding to the leading edge of the copying paper is deenergized (or energized in the case of the shutter solenoid unit 105) and, thereafter and before the subroutine terminates and the program flow returns to the main routine, a process for selectively driving, for a predetermined length of time, the developing device containing the white toner material is executed at step S225.

Where the state check at step S200 indicates "3", the program flow proceeds to step S230 at which a process for selecting the developing device containing the toner material of a color specified through the operating panel (FIG. 2) is executed. Then, at step S231, the state is rendered to be 0 and the subroutine terminates, and the program flow returns to the main routine.

As can be understood from the description made with reference to the flowcharts, only when a plurality of developing devices containing toner material of respectively different colors, including the developing device containing the white toner material, are utilized, the developing device containing the white toner material can be selectively driven to apply the white toner material to that portion of the photoreceptor drum corresponding to a predetermined area of the leading edge of the copying paper with respect to the direction of conveyance of such copying paper.

According to the first preferred embodiment of the present invention hereinabove described with reference to FIGS. 1 to 13, it is clear that, only when a toner color identifying means indicates the presence of the white toner material in the associated developing device, the developing device so containing the white toner material can be selectively driven to apply the white toner material to that portion of the photoreceptor drum corresponding to a predetermined area of the leading edge of the copying paper with respect to the direction of conveyance of such copying paper while the toner material of a color other than white and specified by an operator of the machine through the operating panel can be applied to the other area than the predetermined area. Accordingly, the interposition of the white toner material between the predetermined area of the leading edge of the copying paper and the outer peripheral surface of the photoreceptor drum is effective to lessen the electrostatic force of attraction acting on the leading edge of the copying paper from the photoreceptor drum. Therefore, it is possible to avoid any possible tight contact between the copying paper and the outer peripheral surface of the photoreceptor drum, which would otherwise hamper a smooth separation of the copying paper from the outer peripheral surface of the photoreceptor drum. Thus, the present invention is advantageous in that the separation of the copying paper from the outer peripheral surface of the photoreceptor drum can be facilitated at the separating station and, also, the occurrence of a paper jam can be minimized.

Considering the copy having been made with the white toner particles fixed on the leading edge thereof, the white toner particles so fixed will not form a noticeable stain on the copy if the copy is made on a white copying paper. Where it is usual to make a copy on copying papers of a different color, for example, yellow, yellow toner material may be employed in place of the white toner material.

Second Embodiment (FIGS. 2 to 11 & 14 to 16)

The accompanying drawings to which reference should be made in the following description of the second preferred embodiment of the present invention include FIGS. 2 to 11 and 14 to 16. The second preferred embodiment of the present invention is designed to permit the developing device containing the white toner material not to be brought into operation in the event that a special sheet such as a thick and firm paper having a varying light permeability, for example, a plastics sheet generally used in association with an overhead projector or a tracing paper is supplied. This kind of special sheet is generally pliable, more pliable than the standard copying paper, more or less tending to stretch taut, and accordingly, it can be readily separated away from the photoreceptor drum with no need to apply the white toner material to the leading edge of the paper such as in the foregoing embodiment.

Figure 14:
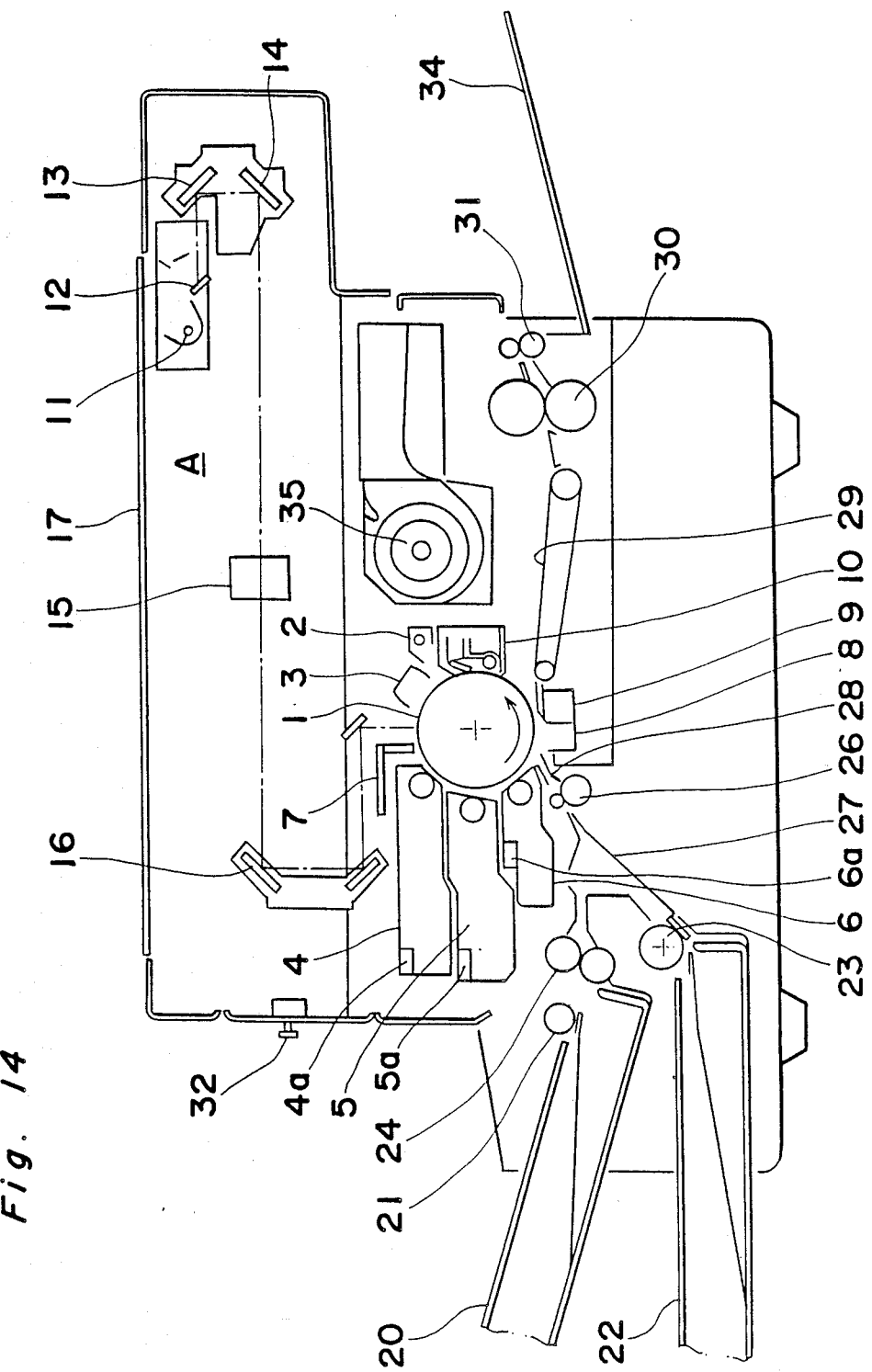
FIG. 14 is a schematic longitudinal sectional view of the electrophotographic copying machine according to a second preferred embodiment of the present invention.
Figure 15:
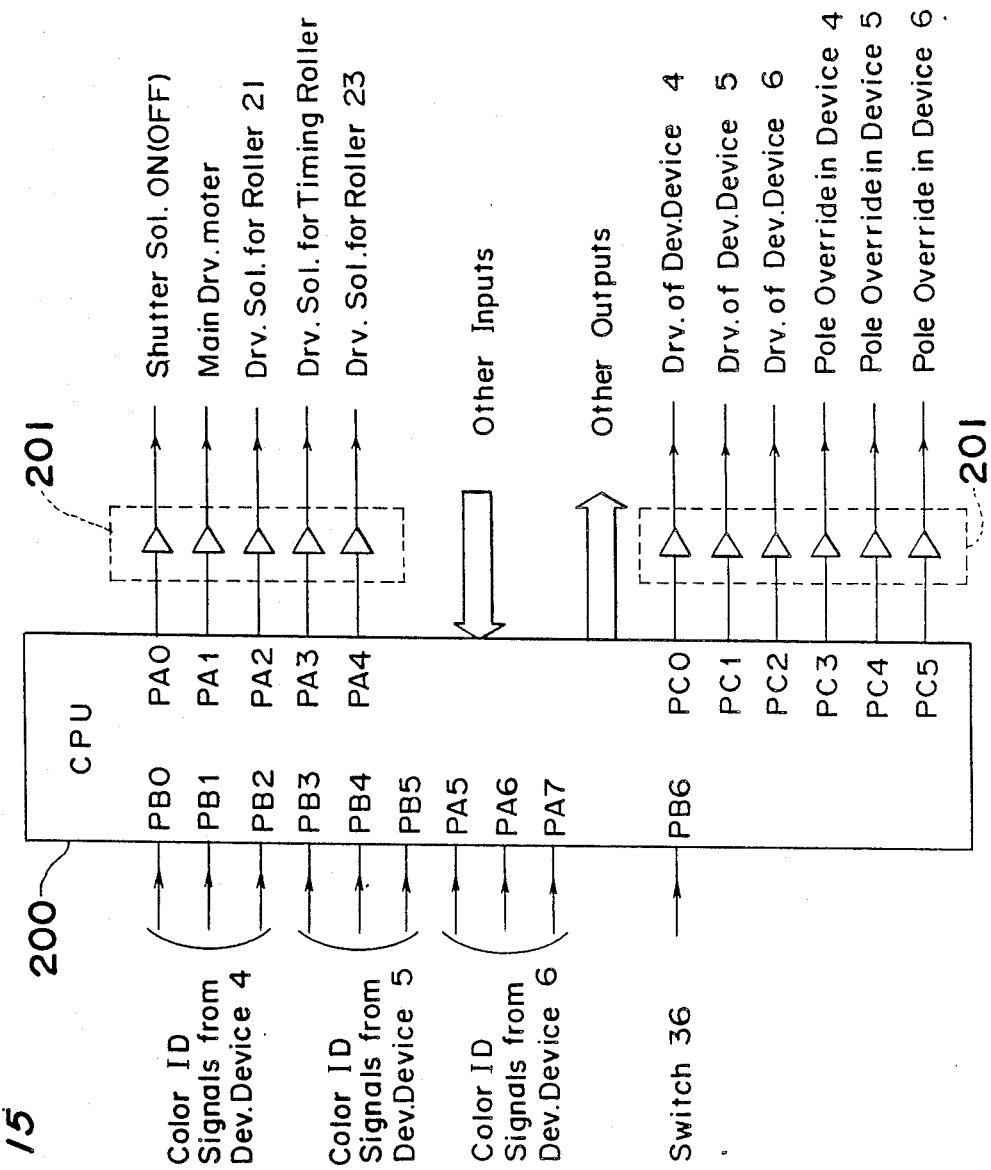
FIG. 15 is a schematic diagram showing the microcomputer used in the copying machine according to the second preferred embodiment of the present invention.

To this end, while the copying machine according to the second preferred embodiment of the present invention is generally similar in structure and function to that described in connection with the first preferred embodiment of the present invention, a select switch 32 is utilized as shown in FIG. 14. This select switch 32 is adapted to be turned on when the special sheet is utilized in place of the standard copying papers. As shown in FIG. 15, an output signal from the select switch 32 is supplied to an input port PB6 of the microcomputer 200 to permit the microcomputer to determine in reference to the output signal from the switch 32 if the special paper is utilized.

Figure 16:
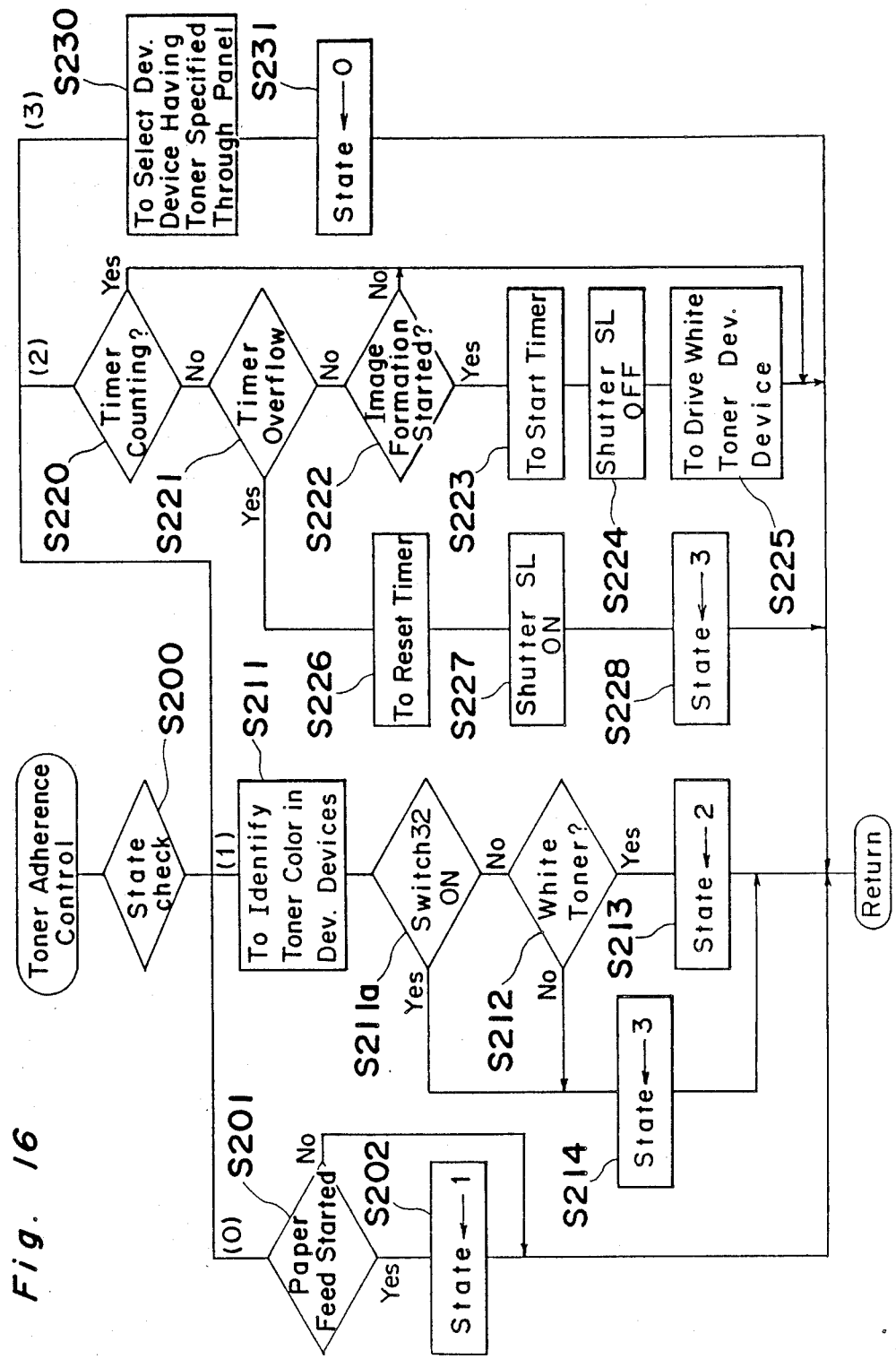
FIG. 16 is a flowchart showing the toner adherence control subroutine executed during the sequence of operation of the microcomputer shown in FIG. 15.

Consequent upon the additional use of the select switch 32, only the branch flow (2) of the subroutine shown in and described with reference to FIG. 13 is modified to have an extra step S211a between steps S211 and S212 as shown in FIG. 16. Referring to FIG. 16, step S211a is a decision step at which a decision is made to determine if the select switch 32 has been turned on, that is, if the special sheet is utilized. Where the select switch 32 is turned on, the program flow returns to the main routine through step S214, that is, the program flow returns to the main routine without the application of the white toner to the predetermined area of the photoreceptor drum corresponding to the leading edge of the copying paper being effected. On the other hand, where the select switch 32 is turned off, the process similar to that described in connection with the foregoing embodiment takes place to apply the white toner material to that predetermined area of the photoreceptor drum corresponding to the leading edge of the copying paper.

It is to be noted that, in the practice of the second preferred embodiment of the present invention, a combination of an actuator with a light-permeability sensor may be employed, in place of the select switch, for the detection of the special sheet. Alternatively, in place of the select switch 32, a photoelectric detector assembly comprising a light emitting element and a light receiving element may be employed for detecting the difference in light permeability between the standard copying paper and the special sheet. Where the photoelectric detector assembly is employed, the light emitting element and the light receiving element should be positioned on respective sides of the path through which either the standard copying paper or the special sheet is supplied, so that in the event of the passage of the special sheet the application of the white toner material to that predetermined area of the photoreceptor drum corresponding to the leading edge of the special sheet can be automatically inhibited.

Third Embodiment FIGS. 2 to 10 and 17 to 19)

The accompanying drawings to which reference should be made in the following description of the third preferred embodiment of the present invention include FIGS. 2 to 10 and 17 to 19. The third preferred embodiment of the present invention is so designed that only one of the developing devices, which contains the toner material of the same color as that of the copying paper, can be selectively brought into operation to apply the toner material within such one of the developing devices to the leading edge of the paper such as in the foregoing embodiment.

Figure 17:
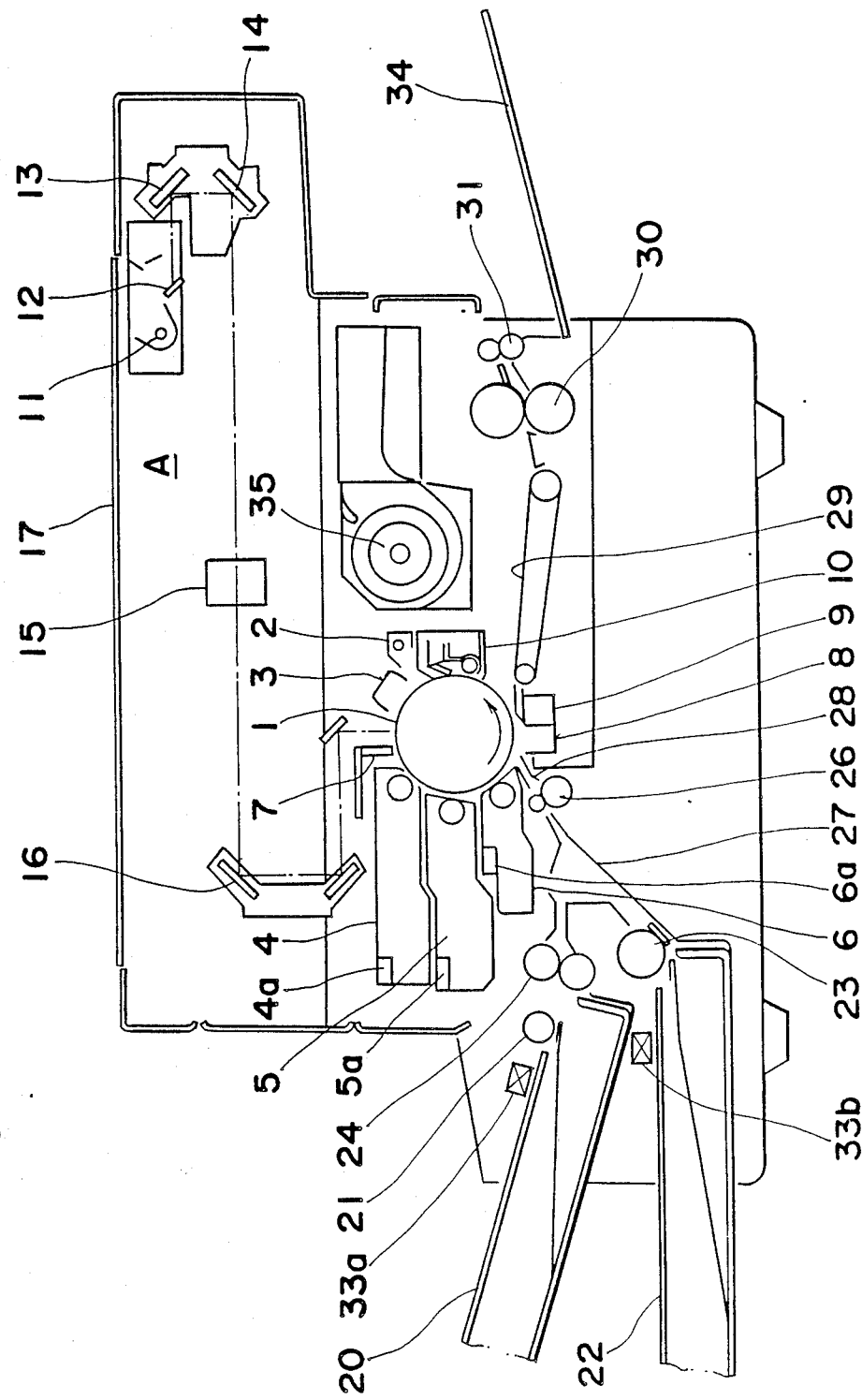
FIG. 17 is a schematic longitudinal sectional view of the electrophotographic copying machine according to a third preferred embodiment of the present invention.
Figure 18:
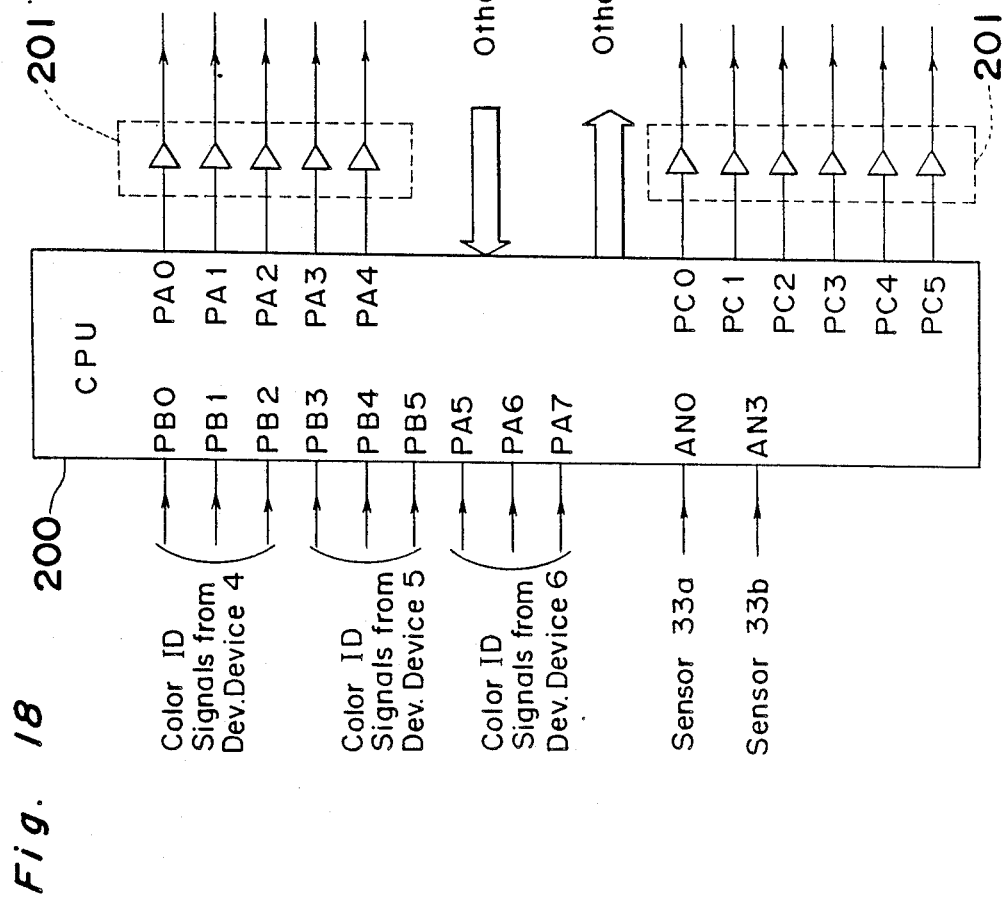
FIG. 18 is a schematic diagram showing the microcomputer used in the copying machine according to the third preferred embodiment of the present invention.

To this end, while the copying machine according to the third preferred embodiment of the present invention is generally similar in structure and function to that described in connection with the first preferred embodiment of the present invention, color sensors 33a and 33b are employed as best shown in FIG. 17. The color sensor 33a is supported in position to detect the color of the stack of copying papers in the paper cassette 20, and the color sensor 33b is supported in position to detect the color of the stack of copying papers in the paper cassette 22. Respective outputs from the color sensors 33a and 33b are supplied to analog input ports AN0 and AN3 of the microcomputer 200 as shown in FIG. 18.

Each of the color sensors 33a and 33b is a semiconductor color sensor, and the details the operating principle of such color sensor are well known to those skilled in the art.

Figure 19:
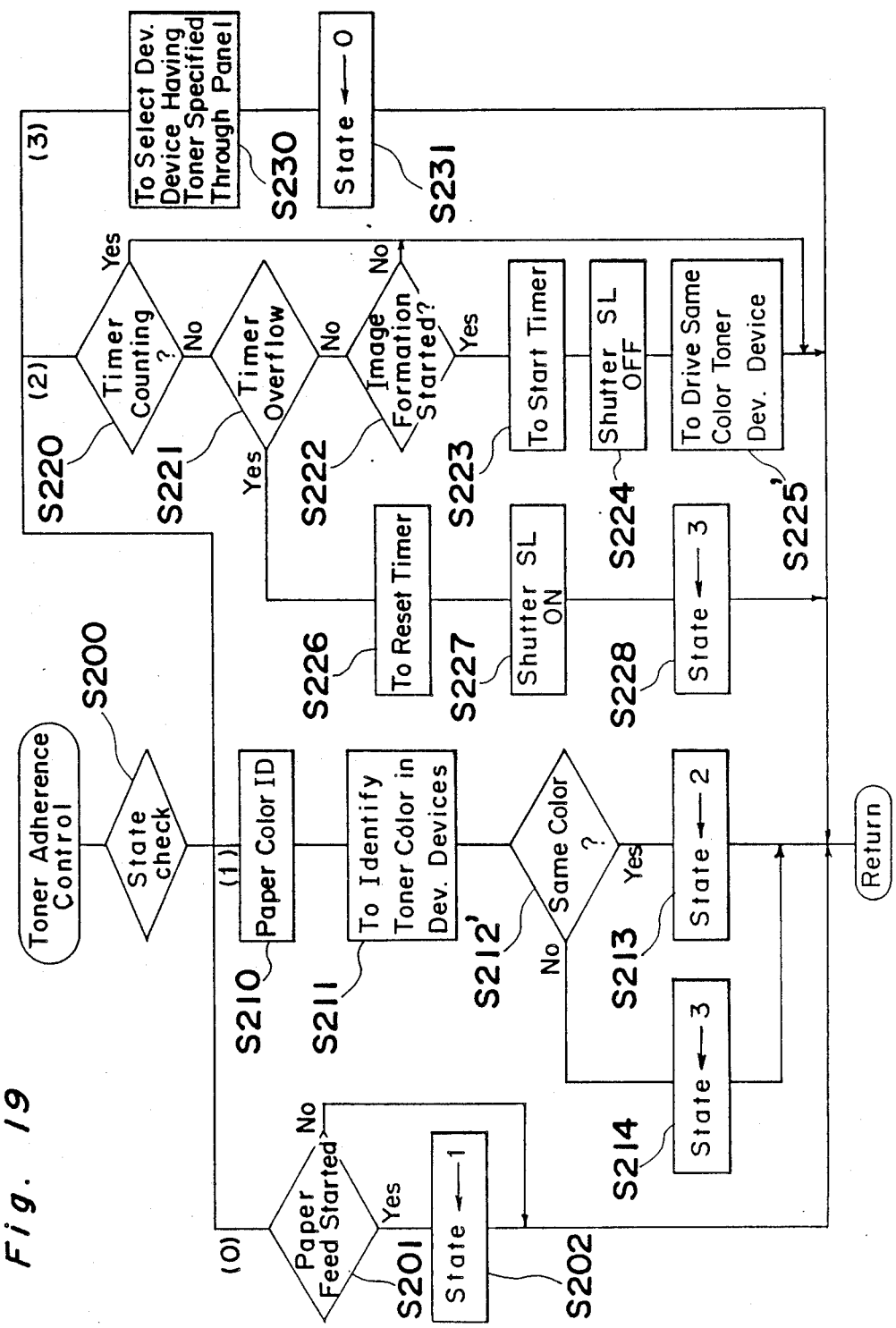
FIG. 19 is a flowchart showing the toner adherence control subroutine executed during the sequence of operation of the microcomputer shown in FIG. 15.

Consequent upon the use of the color sensors 33a and 33b, the drive of the developing device containing the white toner material which has been described and shown as carried out at step #225 in the flowchart of FIG. 13 is replaced with step #225' at which one of the developing devices containing the toner material of the same color as that of the copying paper is driven in the flowchart of FIG. 19. Also, only the branch flow (1) of the subroutine shown in and described with reference to FIG. 13 is modified as shown in FIG. 19. Referring now to FIG. 19, where the state check at step S200 indicates "1", the color of the copying papers in each of the upper and lower paper cassettes 20 and 22 is identified before the colors of toner accommodated in the mounted developing devices 4, 5 and 6 are identified at step S211. Subsequent to step S 211, a decision step S212' takes place to determine if any one of the developing devices 4, 5 and 6 contains the toner material of the same color as the color of the copying paper identified at step S210. In the event that the result of the decision at step S212' indicates "Yes", the program flow proceeds to step S213 at which the state is rendered to be 2, but in the event that the result of the decision at step S212' indicates "No", the program flow proceeds to step S214 at which the state is rendered to be 3, and the subroutine subsequently terminates.

Thus, it will readily be understood that, according to the third preferred embodiment of the present invention, only when it is found that the toner material of the same color as that of the copying papers used in any one of the upper and lower paper cassettes is contained in one of the developing devices, such one of the developing device can be selectively driven into operation to apply the toner material to the predetermined area of the photoreceptor drum corresponding in position to the leading edge of the copying paper of the same color as that of the applied toner material. This is particularly advantageous when deposition on a copying paper of toner particles of different color from that of the copying paper is objectionable.

Fourth Embodiment (FIGS. 2 to 10 and 20 to 22)

As is well known to those skilled in the art, for a given standard copying paper and for a given type of a paper separating unit disposed at the separating station, the extent to which the copying paper after having been transferred with the visible powder image at the transfer station is smoothly separated away from the photoreceptor drum at the subsequent separating station tends to be affected by several conditions including, inter alia, the state of adherence of toner particles to the photoreceptor drum, the charging condition of the photoreceptor drum, the moisture content of the copying paper used and the relative humidity in the atmosphere in which the copying job is performed. In any one of the foregoing embodiments of the present invention, the influence brought about by the moisture content, or the humidity, of the copying papers has not been taken into consideration. Accordingly, the fourth preferred embodiment of the present invention which will now be described with particular reference to FIGS. 2 to 10 and 20 to 22 is so designed that, only when the moisture content as detected of the copying papers placed in at least one of the paper cassettes exceeds a predetermined value, toner particles of the same color as that of the copying papers are applied to that predetermined area of the photoreceptor drum, which corresponds in position to the leading edge of the copying paper are applied so that the separation of the copying paper from the photoreceptor drum can be facilitated with no substantial possibility of the copying paper carried by the photoreceptor drum past the separating station subsequent to the transfer of the powder image onto such copying paper.

More specifically, the present invention according to the fourth preferred embodiment will now be described as applied to the copying machine according to the third preferred embodiment thereof. In summary, it will readily be seen that, according to the fourth embodiment of the present invention as applied to the third embodiment, when the moisture content of the copying papers exceeds the predetermined value and, at the same time, when it is found that the toner material of the same color as that of the copying papers used in any one of the upper and lower paper cassettes is contained in one of the developing devices, such one of the developing device can be selectively driven into operation to apply the toner material to the predetermined area of the photoreceptor drum corresponding in position to the leading edge of the copying paper of the same color as that of the applied toner material.

Figure 20:
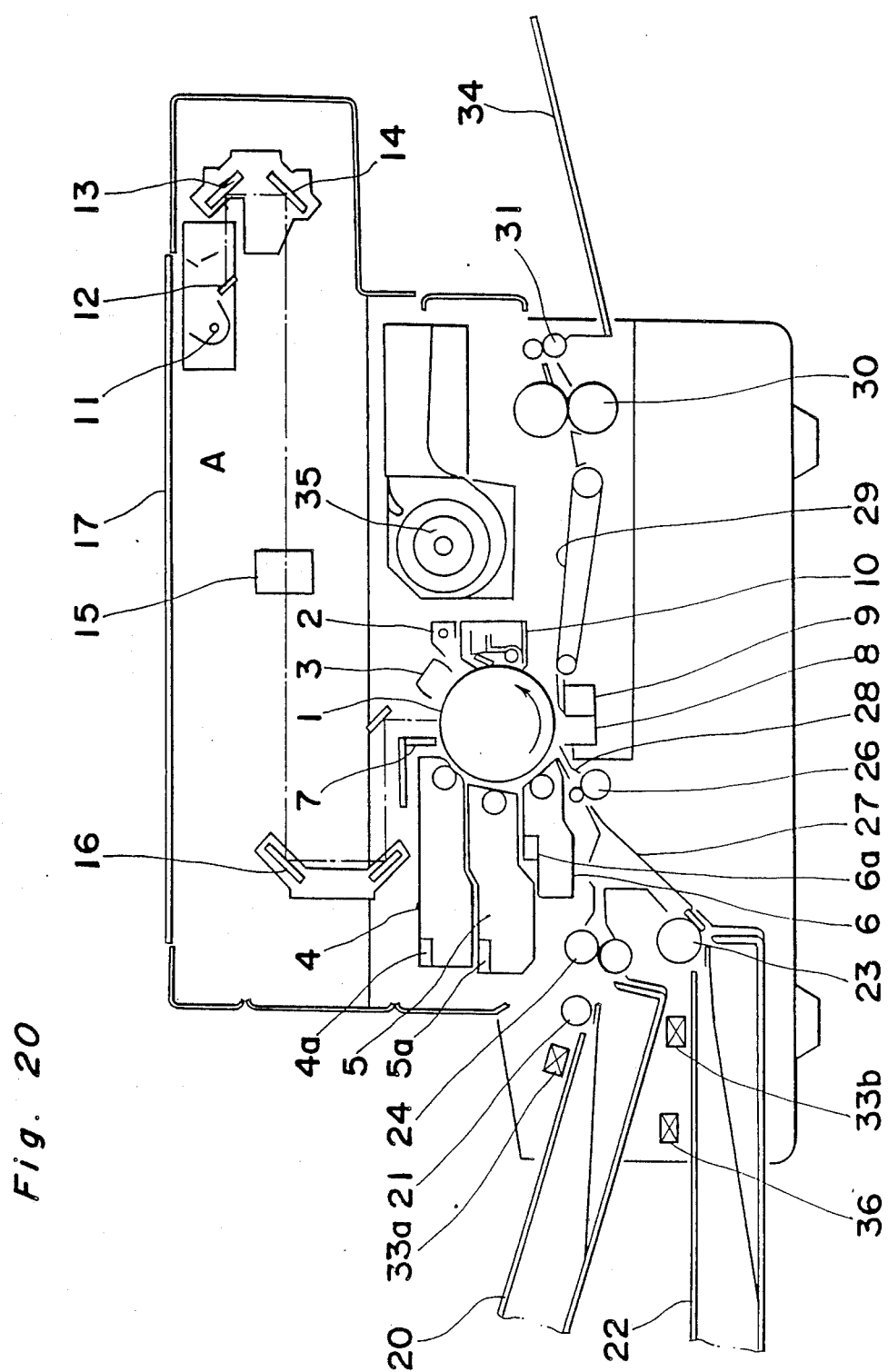
FIG. 20 is a schematic longitudinal sectional view of the electrophotographic copying machine according to a fourth preferred embodiment of the present invention.

Referring first to FIG. 20, the copying machine shown therein is similar to that according to the third embodiment of the present invention particularly as shown in FIG. 17, except that, in addition to the color sensors 33a and 33b shown in FIG. 17, a humidity sensor 36 is employed. The humidity sensor 36 is of a type whose electric resistance varies with change in relative humidity and is of a well-known construction. This humidity sensor 36 is supported by the machine housing at a location intermediate between the upper and lower paper cassettes 20 and 22 for accurately detecting the moisture condition to which the papers have been adjusted.

Figure 21:
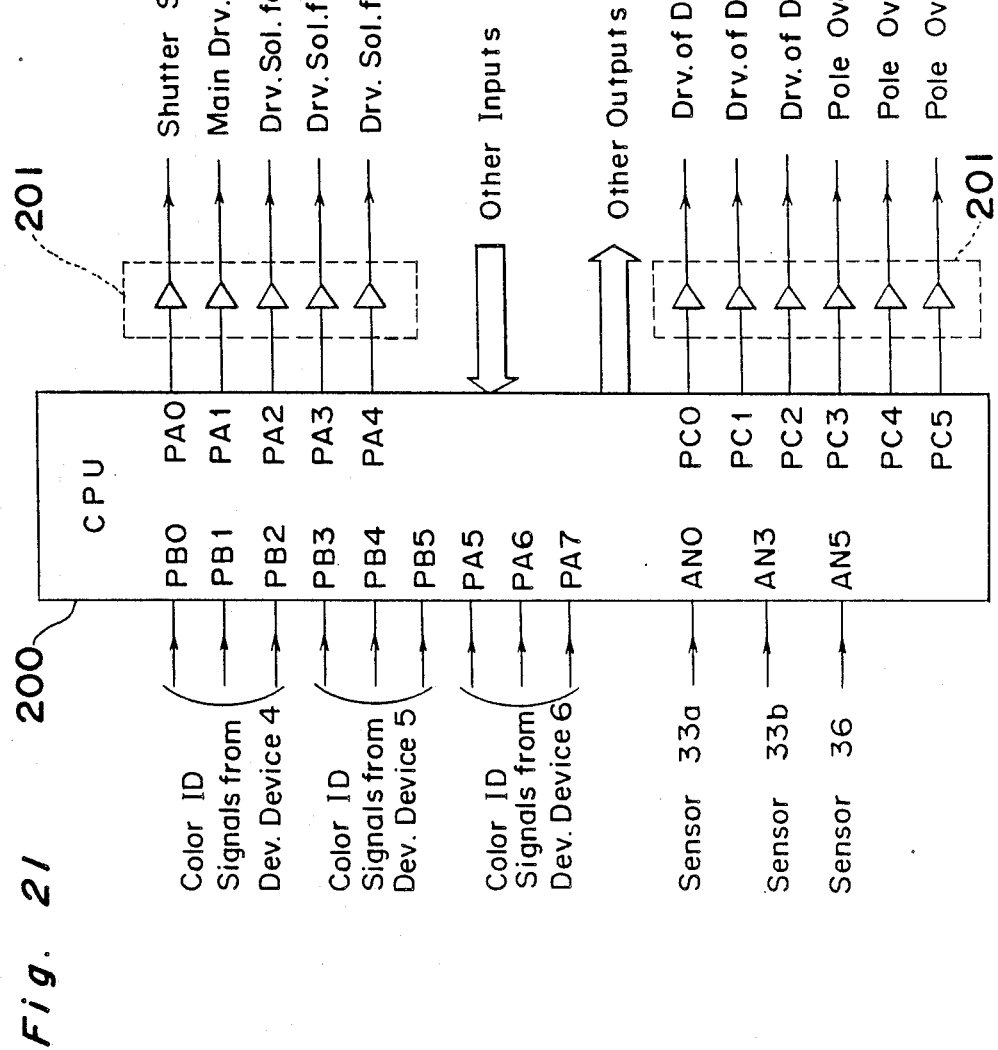
FIG. 21 is a schematic diagram showing the microcomputer used in the copying machine according to the fourth preferred embodiment of the present invention.

As best shown in FIG. 21, an output signal from the humidity sensor 36 is applied to an analog input port AN5 of the microcomputer 200.

Figure 22:
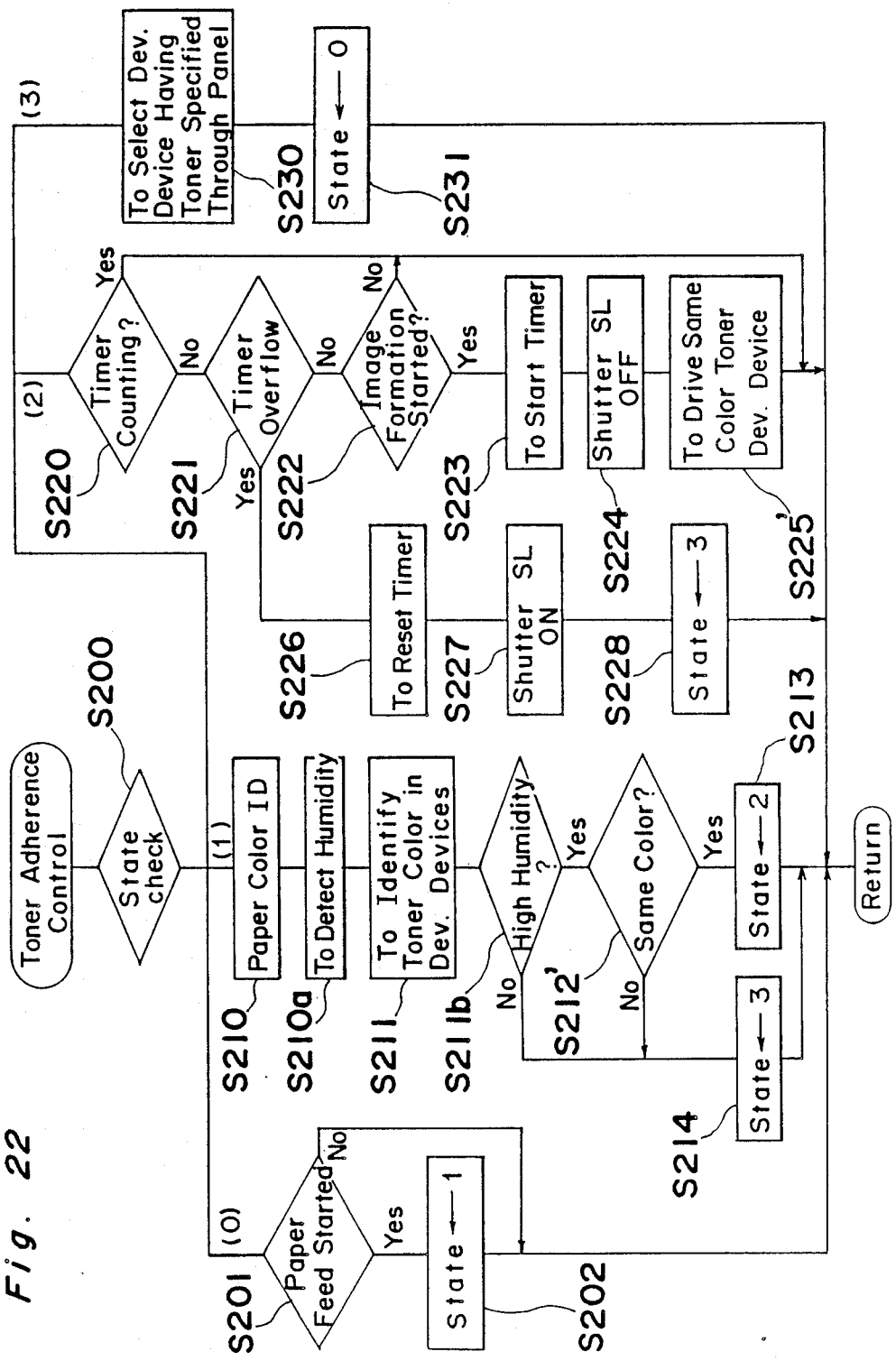
FIG. 22 is a flowchart showing the toner adherence control subroutine executed during the sequence of operation of the microcomputer shown in FIG. 21.

Consequent upon the use of the humidity sensor 36 in combination with the color sensors 33a and 33b, the drive of the developing device containing the white toner material which has been described and shown as carried out at step #225 in the flowchart of FIG. 13 is replaced with step #225' at which one of the developing devices containing the toner material of the same color as that of the copying paper is driven in the flowchart of FIG. 22. Also, only the branch flow (1) of the subroutine shown in and described with reference to FIG. 13 is modified as shown in FIG. 22. Referring now to FIG. 22, where the state check at step S200 indicates "1", and subsequent to step S210 at which the color of the copying papers in each of the upper and lower paper cassettes 20 and 22 is identified, the humidity is detected by the humidity sensor 36 at step S210a, followed by step S211 at which the colors of toner accommodated in the mounted developing devices 4, 5 and 6 are identified. Thereafter, a decision step S211b takes place to determine if the humidity detected by the humidity sensor 36 is higher than a predetermined value. When the humidity detected is found higher than the predetermined value, another decision step S212' takes place to determine if any one of the developing devices 4, 5 and 6 contains the toner material of the same color as the color of the copying paper identified at step S210. In the event that the result of the decision at step S212' indicates "Yes", the program flow proceeds to step S213 at which the state is rendered to be 2.

When the result of the decision at step S211b indicates that the humidity detected is not higher than the predetermined value, or when the result of the decision at step S212' indicates that no one of the developing devices 4, 5 and 6 contain the toner material of the same color as the color of the copying paper identified at step S210, the program flow proceeds to step S214 at which the state is rendered to be 3, and the subroutine subsequently terminates with the main flow of FIG. 12 resumed.

It is to be noted that the use of the humidity sensor according to the fourth embodiment described above can be equally made to any one of the first and second embodiments of the present invention.

Fifth Embodiment (FIGS. 1 to 10 and 23 to 27)

The copying machine according to the fifth embodiment of the present invention which will subsequently be described with particular reference to FIGS. 1 to 10 and 23 to 27 are provided not only with all of the features described in connection with any one of the second and third embodiments of the present invention, but also with a manual paper feed capability.

Figure 23A:
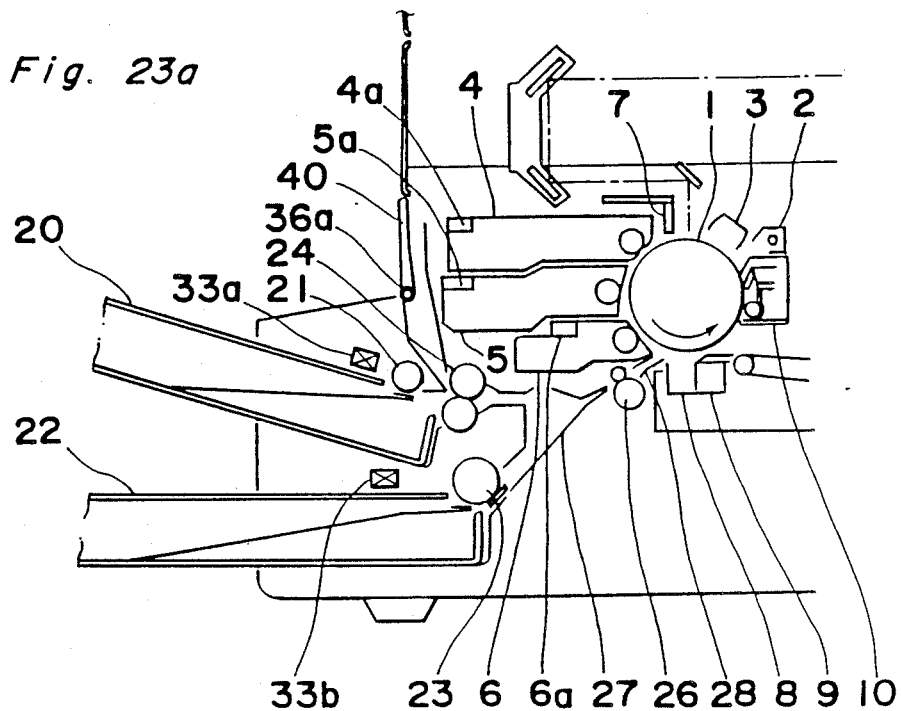
FIG. 23a is a schematic longitudinal sectional view of a portion of the electrophotographic copying machine according to a fifth preferred embodiment of the present invention.
Figure 23B:
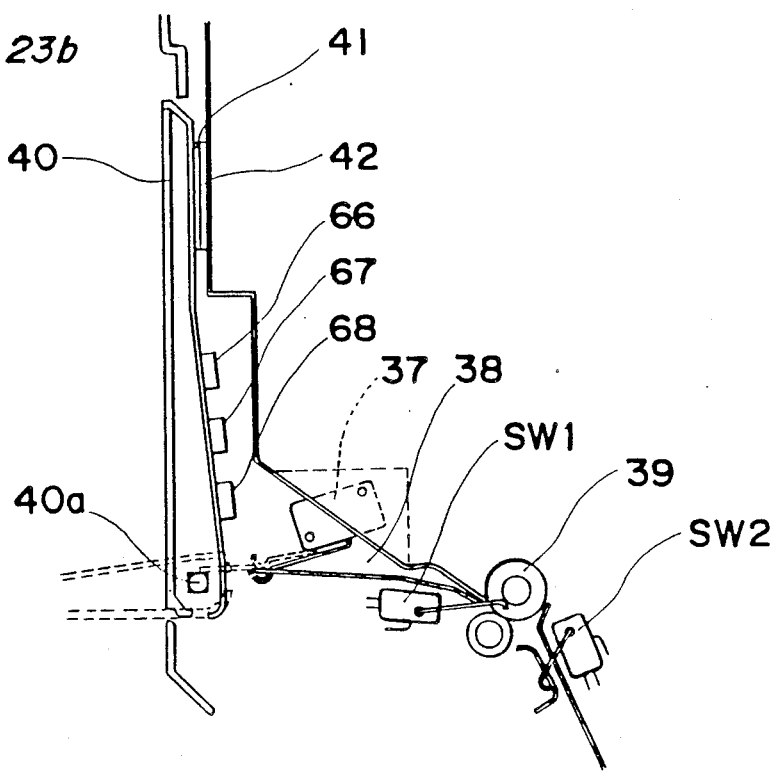

Referring first to FIGS. 23a and 23b which illustrate only a left-hand portion of the copying machine of FIG. 17 and an enlarged version of that portion of the copying machine of FIG. 17, reference numeral 40 represents a generally rectangular foldable guide table supported above the upper paper cassette 20 and connected at one end by means of a pivot shaft 40a to the machine housing for pivotal movement between folded and horizontal positions about the pivot shaft 40a. When in the folded position as shown, the guide table 40 is retained in position by means of a magnet piece 41 magnetically engaged to a metal sheet 42 secured to the machine housing. When in the horizontal position partially shown by the phantom line in FIG. 23b, the guide table 40 lies substantially horizontally for receiving a copying sheet which the machine operator may place thereon.

Reference numeral 37 represents a mode selector switch for selecting one of a manual feed mode and an automatic feed mode. This mode selector switch 37 is operatively associated with the pivotal movement of the guide table 40 and is capable of providing a manual feed signal to an input port PB7 of the microcomputer 24 as shown in FIG. 24, which microcomputer 24 assumes in the absence of the manual feed signal that the machine is set in the automatic feed mode.

The copying sheet placed on the guide table 40 in the horizontal position can be supplied towards the transfer station by a feed roller pair 39 through a delivery passage 38. At least one of the rollers forming the feed roller pair 39 can be driven when a first detector switch SW1 capable of being activated when the copying is possible. Along the delivery passage 38, a second detector switch SW2 is provided, which switch SW2 is utilized to energize a warning lamp 68, provided on the guide table 40 for indicating that the manual feed of the copying sheet is inhibited, and also to initiate the scanning motion of the optical system A. The guide table 40 also has a multi-ply sheet mode selector switch 66 for selectively setting the machine in a multi-ply sheet mode. When this selector switch 66 is activated, a display LED 67, also mounted on the guide table 40 is energized to indicate that the multi-ply sheet mode has been selected.

Figure 24:
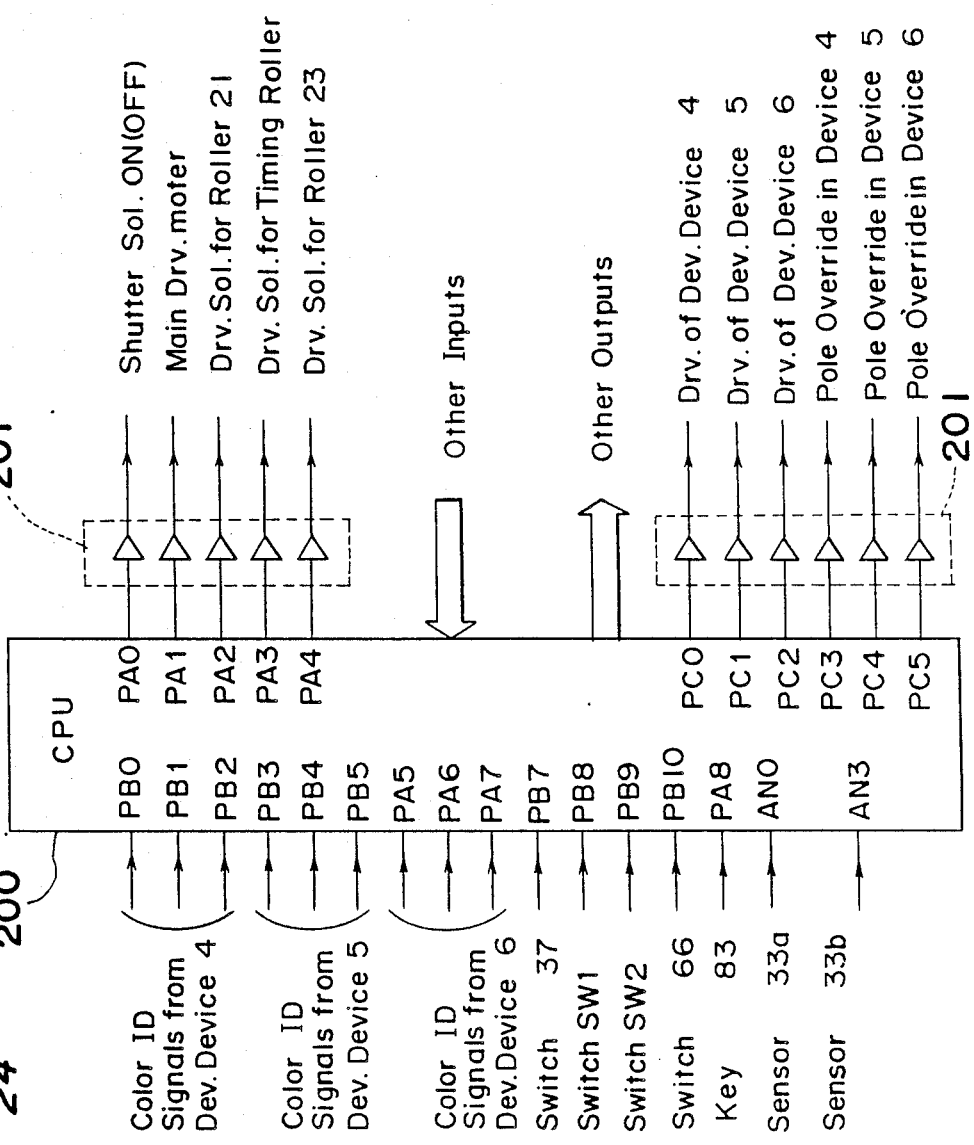
FIG. 24 is a schematic diagram showing the microcomputer used in the copying machine according to the fifth preferred embodiment of the present invention.

All of respective signals generated from the switches 37, SW1, SW2 and 66 are supplied to respective input ports PB7, PB8, PB9 and PB10 of the microcomputer 200 as best shown in FIG. 24.

It is to be noted that the term "multi-ply sheet" referred to above and hereinafter is intended to means those papers which the copying machine in general can accommodate and which have a relatively great thickness, as compared with the standard copying papers, and is to be understood as including, for example, Bristol board, plastics sheets and tracing papers, although the plastics sheets and the tracing papers may be of a single ply sheet.

Figure 25:
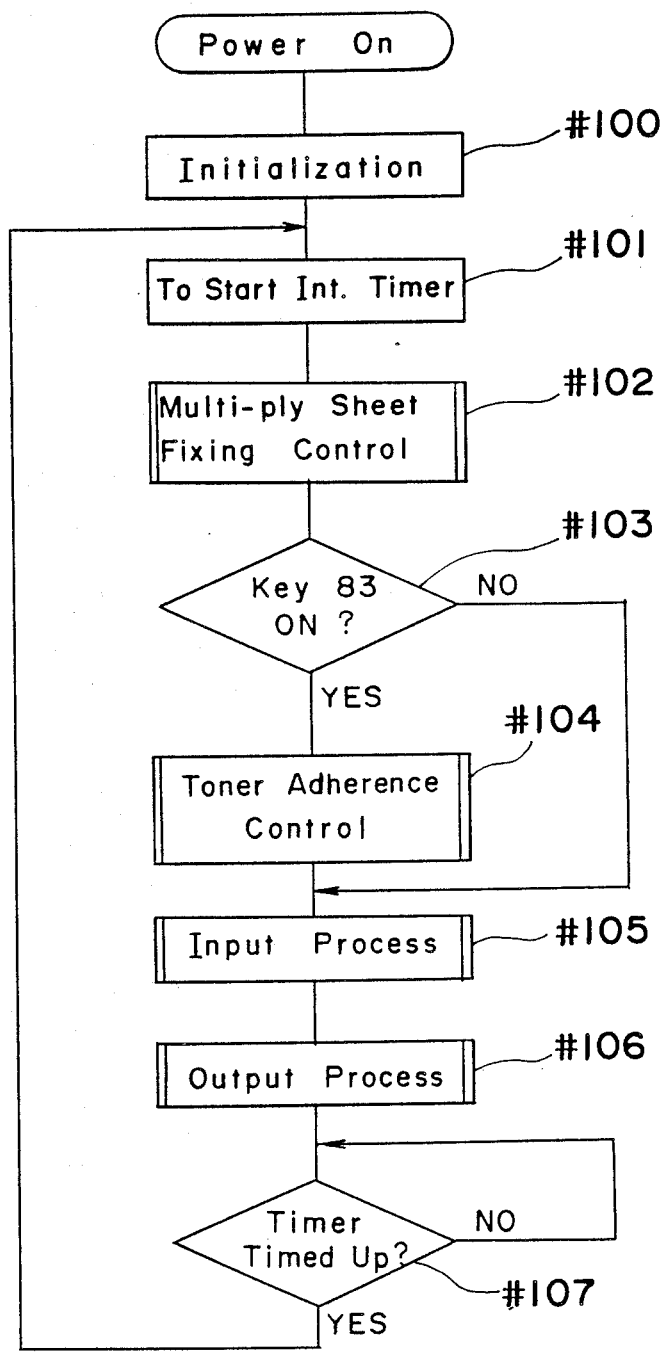
FIG. 25 is a flowchart showing the sequence of operation of the microcomputer shown in FIG. 24.

The machine according to the fifth embodiment of the present invention operates under the control of the microcomputer 200 which performs the sequence of operation as best shown in FIG. 25.

Referring now to FIG. 25, assuming that the machine is electrically powered, internal registers and various timers are initialized to respective initial states at step #100. At subsequent step #101, the internal timers are started to determine one routine time during which the subsequent process takes place. In other words, this process is performed in the machine embodying the present invention for each routine time which is a minute time.

Figure 26:
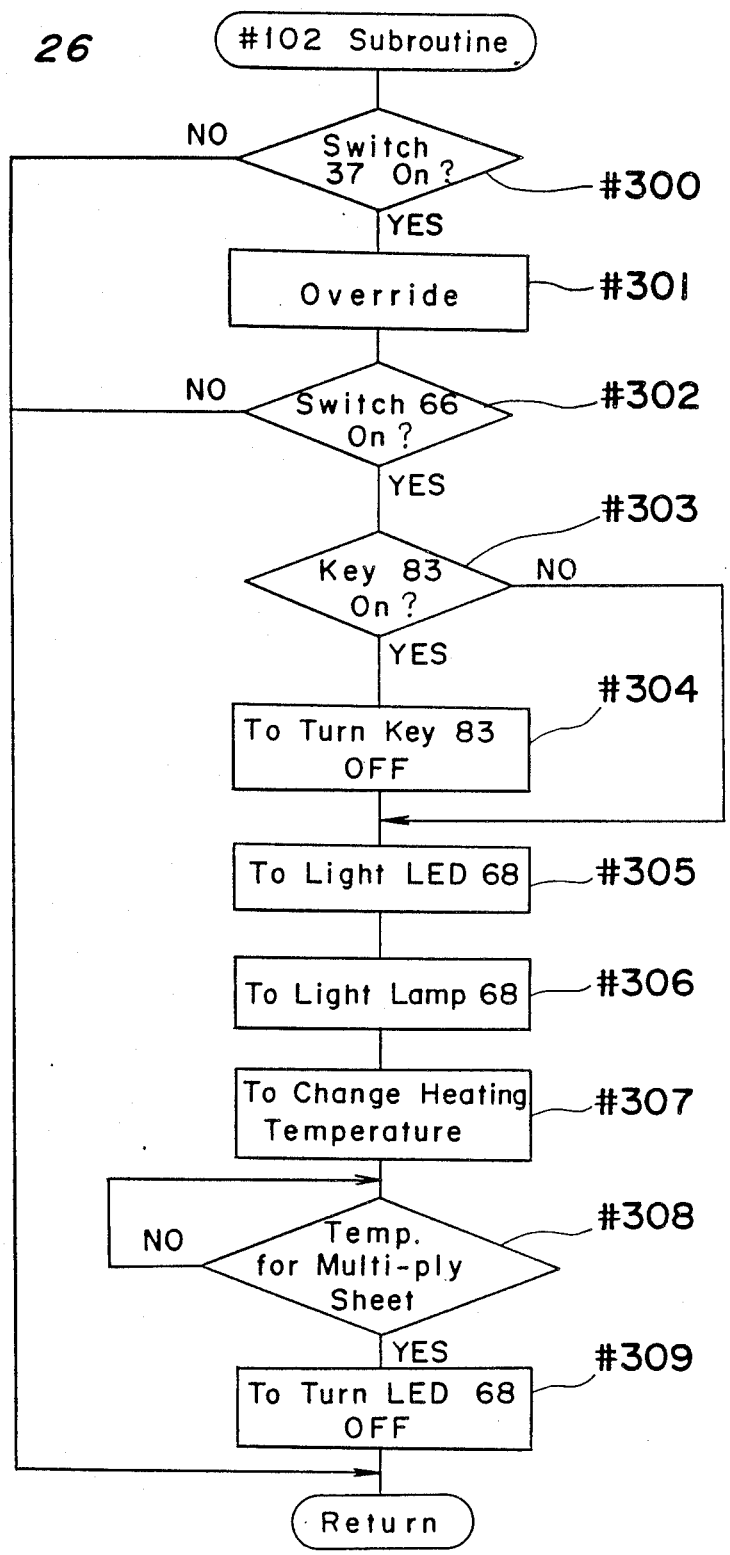
FIG. 26 is a flowchart showing a multi-ply sheet fixing control subroutine executed during the execution of the flow of FIG. 25.

At step #102, a MULTI-PLY SHEET FIXING CONTROL routine, the details of which are shown in FIG. 26, is executed, followed by a decision step #103 to determine if the TONER ADHERENCE CONTROL execution key 83 shown in FIG. 2 has been depressed, that is, turned on. If the result of the decision at step #103 indicates that the execution key 83 has been turned on, the program flow proceeds to step #104 at which the toner adherence control routine for controlling the adherence of toner to the leading edge of a copying paper is executed, the details of which routine are identical with those shown in and described with reference to FIG. 19. On the other hand, if the result of the decision at step #103 indicates that the execution key 83 has not been turned on, no toner adherence control routine is executed and the program flow proceeds to step #105.

At step #105 and subsequent step #106, the input process and the output process other than those described above are executed. Since the details of each of the input and output processes executed at steps #105 and #106 do not constitute subject matter of the present invention and are well known to those skilled in the art, they are not herein reiterated.

At step #107, a decision is made to determine if the internal timers have been timed up. If the result of the decision indicates "Yes", the program flow returns to step #101, but if it indicates "No", a wait takes place until the internal timers are timed up.

The details of the MULTI-PLY SHEET FIXING CONTROL routine will now be described with reference to FIG. 26. Subsequent to step #101 of the main flow shown in FIG. 12, and at step #300, a decision is made to determine if the mode selector switch 37 has been turned on, i.e., if the guide table 30 has been moved to the horizontal position in readiness for the receipt of the multi-ply sheet. In the event that the mode selector switch 37 has been turned on, the program flow proceeds to step #301 at which the override takes place from a normal mode onto the manual feed mode, followed by step #302 at which a decision is made to determine if the multi-ply sheet mode selector switch 66 is turned on. Should the selector switch 66 has been turned on, the program flow proceeds to step #303 at which another decision is made to determine if the key 83 has been turned on.

In the event that the selector switch 66 has been turned on and the key 83 has been subsequently turned on, the key 83 is turned off at step #304. However, if the key 83 has not been turned on, the program flow proceeds to step #305, at which the mode display LED 67 for indicating that the manual feed mode has been selected is lit, and then to step #306 at which the warning lamp 68 is lit. Thereafter, at step #307, the heating temperature set in the fixing roller of the fixing device 30 is changed to a temperature appropriate to the multi-ply sheet, and subsequently, a decision is made at step #308 to determine if the heating temperature appropriate for the multi-ply sheet to be fixed has been attained. Unless the heating temperature at which the multi-ply sheet is fixed has been attained, a wait takes place until the heating temperature attains the value appropriate for the multi-ply sheet t be fixed.

On the other hand, should the result of decision at step #308 indicate that the fixing roller of the fixing device 30 has attained the temperature required for the powder image on the multi-ply sheet to be fixed, the mode display LED 68 is turned off to indicate that the next succeeding multi-ply sheet can be inserted, followed by the return of the program flow to the main routine.

It is generally well known that, when the multi-ply sheet such as the generally transparent sheet for use in association with an overhead projector is, after the visible powder image has been transferred onto such sheet, passed through the fixing device in an attempt to fix the powder image thereon, the heat evolved from the fixing roller of the fixing device tends to be absorbed by the multi-ply sheet with consequent reduction in temperature of the fixing roller because of the heat capacity of the multi-ply sheet. Considering this, and if the multi-ply sheet is passed through the fixing device while the fixing roller is heated to a temperature required for the powder image on the standard copying paper to be fixed, the powder image on the multi-ply sheet will be insufficiently fixed. Therefore, where the multi-ply sheet is to be passed through the fixing device, the heating temperature evolved by the fixing roller must be higher than that required for the standard copying papers.

While one method of increasing the heating temperature of the fixing roller is disclosed in the Japanese Laid-open Utility Model Publication No. 56-120562, it is a general practice that, where a copy is desired to be made on the multi-ply sheet, such multi-ply sheet is supplied into the copying machine through the manual feed guide table such as shown and described in connection with the fifth embodiment of the present invention.

In accordance with the present invention represented by the fifth embodiment, the manual feed guide table is provided with a multi-ply sheet switch to provide a multi-ply sheet copying mode signal to an input port of the microcomputer so that the latter can recognize that the multi-ply sheet has been inserted through the guide table.

Also, since the multi-ply sheet is firm like the standard copying paper of adjusted moisture content, tending to stretch taut, no application of the toner particles to the leading edge of the multi-ply sheet is necessary as a rule. Therefore, in the machine according to the fifth embodiment of the present invention as hereinbefore described, arrangement has been made that, in the event that the multi-ply sheet copying mode is selected, the toner particles will not be applied to that predetermined portion of the photoreceptor drum corresponding in position to the leading edge of the multi-ply sheet.

From the foregoing full description of the present invention, it had now become clear that, no matter what type of paper separating or peeling system is employed in the copying machine for separating the copying sheet from the photoreceptor drum then continuously rotated past the transfer station, the copying sheet can be smoothly and with no fault separated therefrom at the separating station because of the presence of the toner deposit at the leading edge of the copying sheet.

Although the present invention has been described in connection with the various preferred embodiments thereof, numerous changes and modifications are apparent to those skilled in the art. Should such changes and modifications do not depart from the scope of the present invention as defined by the appended claims, they should be construed as included therein.

What is claimed is:

1. An image forming apparatus which comprises:
a photoreceptor medium supported for rotation in a predetermined direction;
means for forming an electrostatic latent image on the photoreceptor medium;
a plurality of developing means disposed in face-to-face relationship with the photoreceptor medium for developing the electrostatic latent image into a visible powder image;
means for transferring the powder image onto a copying sheet;
means for supplying the copying sheet to a transfer station where the transferring means is dispose;
means for detecting the color of toner material contained in each of the developing means; and
a control means for causing one of the developing means to apply the toner material of a white color to a portion of the photoreceptor medium, which corresponds in position to a leading edge of the copying sheet, in the event that such one of the developing means is detected as containing the toner material of that white color.

2. The apparatus as claimed in claim 1, further comprising means for selectively driving the control means.

3. The apparatus as claimed in claim 2, wherein said selectively driving means comprises means for detecting the light transmissibility of the copying sheet and means for inhibiting the operation of the control means in the event that the light transmissibility is high.

4. An image forming apparatus which comprises:
a photoreceptor medium supported for rotation in a predetermined direction;
means for forming an electrostatic latent image on the photoreceptor medium;
a plurality of developing means disposed in face-to-face relationship with the photoreceptor medium for developing the electrostatic latent image into a visible powder image;
means for transferring the powder image onto a copying sheet;
means for supplying the copying sheet to a transfer station where the transferring means is dispose;
means for detecting the color of toner material contained in each of the developing means;
means for detecting the color of the toner material contained in each of the developing means;
means for detecting the color of the copying sheet supplied towards the transfer station; and
a control means for causing one of the developing means to apply the toner material of the same color as that of the copying sheet to a portion of the photoreceptor medium, which corresponds in position to a leading edge of the copying sheet, in the event that such one of the developing means is detected as containing the toner material of that same color.

5. The apparatus as claimed in claim 4, further comprising a humidity sensor for detecting the relative humidity and a second control means for activating the control means only when the relative humidity detected by the humidity sensor exceeds a predetermined value.

6. The apparatus as claimed in claim 4, further comprising means for selectively driving the control means.

7. The apparatus as claimed in claim 6, wherein said selectively driving means comprises means for detecting the light transmissibility of the copying sheet and means for inhibiting the operation of the control means in the event that the light transmissibility is high.

8. An electrophotographic copying machine capable of sequentially performing an electrophotographic copying process of imparting an electrostatic charge to the photoreceptor medium at a charging station; forming at an exposure station an electrostatic latent image on the photoreceptor medium in a pattern complemental to an image to be copied; applying toner material at a developing station to the photoreceptor medium to develop the electrostatic latent image into a visible powder image; transferring at a transfer station the powder image onto a copying sheet supplied thereto; separating the copying sheet, with the powder image having been transferred thereto, from the photoreceptor medium; and fixing the powder image on the copying sheet at a fixing station, which machine comprises:
said photoreceptor medium being supported for rotation in one direction sequentially past the charging, exposure, developing, transfer and separating stations;
a plurality of developing units disposed at the developing station for applying the toner material to the photoreceptor medium, said developing units accommodating respective toner material of different colors;
means for selectively driving the developing units one at a time for applying the toner material to form the powder image on the photoreceptor medium;
means for providing information descriptive of the respective colors of toner material in the developing units;
means for transporting the copying sheet sequentially past the transfer and separating stations and towards the fixing station;
means disposed at the transfer station for causing the powder image on the photoreceptor medium to be transferred onto the copying sheet; and
a control means operable, in reference to the information descriptive of the colors of toner material in the respective developing units and in the event that the control means determines that one of the developing units contains the toner material of a particular color substantially identical with that of the copying sheet, to cause one of the developing units to apply the toner material of such particular color to be applied to a portion of the photoreceptor medium, which corresponds in position to the leading edge of the copying sheet with respect to the direction of transport of the copying sheet, for forming a toner deposit on the leading edge of the copying sheet that is necessitated to facilitate a smooth separation of the copying sheet from the photoreceptor medium at the separating station.

9. The machine as claimed in claim 8, wherein the copying sheet is of a white color and said particular color of the toner material is white in color.

10. The machine as claimed in claim 8, further comprising means disposed in the vicinity of an upstream portion of the sheet transporting means with respect to the transfer station for detecting the relative humidity in said upstream portion, said detecting means being operable to disable the control means in the event that the relative humidity detected thereby exceeds a predetermined value.

11. The machine as claimed in claim 8, further comprising means disposed in the vicinity of an upstream portion of the sheet transporting means with respect to the transfer station for detecting the light permeability of the copying sheet, said detecting means being operable to disable the control means in the event that the light permeability deviates from a predetermined value.

* * * * *